US009224094B2

(12) United States Patent
Oliver et al.

(10) Patent No.: US 9,224,094 B2
(45) Date of Patent: Dec. 29, 2015

(54) SYSTEMS, METHODS, AND ARTICLES OF MANUFACTURE TO MEASURE ONLINE AUDIENCES

(71) Applicant: The Nielsen Company (US), LLC, New York, NY (US)

(72) Inventors: James R. Oliver, San Carlos, CA (US); Herbert F. Stackhouse, San Francisco, CA (US); Peter C. Doe, Ridgewood, NJ (US); Qian Tang, Sunnyvale, CA (US); Michelle Ha, San Jose, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 13/750,775

(22) Filed: Jan. 25, 2013

(65) Prior Publication Data

US 2013/0198125 A1  Aug. 1, 2013

Related U.S. Application Data

(60) Provisional application No. 61/591,263, filed on Jan. 26, 2012.

(51) Int. Cl.
  *G06N 5/02* (2006.01)
  *G06Q 30/02* (2012.01)
(52) U.S. Cl.
  CPC .............. *G06N 5/02* (2013.01); *G06Q 30/0246* (2013.01)
(58) Field of Classification Search
  None
  See application file for complete search history.

(56) References Cited

U.S. PATENT DOCUMENTS

| | | |
|---|---|---|
| 2004/0088212 A1 | 5/2004 | Hill |
| 2008/0086741 A1 | 4/2008 | Feldman et al. |
| 2011/0208860 A1 | 8/2011 | Sim et al. |
| 2011/0246641 A1* | 10/2011 | Pugh et al. ................... 709/224 |
| 2012/0005213 A1* | 1/2012 | Hannan et al. ............... 707/741 |
| 2012/0089697 A1* | 4/2012 | Bhatia et al. ................. 709/217 |
| 2013/0064109 A1* | 3/2013 | Combet et al. ............... 370/252 |

OTHER PUBLICATIONS

Danaher, P. "Modeling Page views across multiple websites with an application to internet reach and frequency prediction." Marketing Science vol. 26 No. 3 (2007): pp. 422-437.*

Danaher, P. "Modeling page views across multiple websites with an application to internet reach and frequency prediction." Marketing Science Vol 26 No. 3 (2007): pp. 422-437.*

Richard W. Goosey, "Advanced Techniques in Panel and Server Data Integration", ESOMAR/ARF WAM Conference-Online, Jun. 2005, (16 pages).

(Continued)

*Primary Examiner* — Kakali Chaki
*Assistant Examiner* — Eric Nilsson
(74) *Attorney, Agent, or Firm* — Hanley, Flight & Zimmerman, LLC

(57) ABSTRACT

Methods and apparatus to monitor media content at a content display site are described. An example method includes obtaining panelist data corresponding to a plurality of panelists accessing web pages at measured locations, classifying the panelist data according to demographic information of the panelists, generating a virtual panel based on an estimate of web page access at unmeasured locations, and classifying page view data associated with the unmeasured locations based on data corresponding to the virtual panel.

21 Claims, 20 Drawing Sheets

(56) References Cited

OTHER PUBLICATIONS

Peter J. Danaher, "Modeling Page Views Across Multiple Website with an Application to Internet Reach and Frequency Predication", Marketing Science, vol. 26, No. 3, May-Jun. 2007, (2 pages).

John Brauer, "Next Generation Audience Measurement", The Nielsen Company, Jun. 2011, (8 pages).

International Search Report and Written Opinion, issued by the Korean Intellectual Property Office in connection with International application No. PCT/US2013/023259, on May 3, 2013, 10 pages.

Mainak Mazumdar, "Mash-up, Scale-Down or Observe: Nielsen's Panel and Census Integration Strategy", Worldwide Readership Research Symposium, Session 2.2, 2009, 6 pages.

International Bureau, "International Preliminary Report on Patentability," issued in connection with Application No. PCT/US2013/023259, Aug. 7, 2014, 9 pages.

IP Australia, "Patent Examination Report No. 1," issued in connection with Application No. 2013204255, Jan. 6, 2015, 3 pages.

Japanese Patent Office, "Notice of Rejection", issued in connection with Japanese Application No. P2014-554879, on Aug. 11, 2015, 12 pages.

Australian Patent Office, "Notice of Acceptance", issued in connection with Australian Patent Application No. 2013204255, on Sep. 18, 2015, 2 pages.

Canadian Intellectual Property Office, "Office Action," issued in connection with application No. 2,862,549 on Oct. 5, 2015, 3 pages.

\* cited by examiner

| day of week | Day part | demo group | weighted panel page views | panel page view distribution % |
|---|---|---|---|---|
| 1 | 1 | 1 | 6738.647 | 0.25% |
| 1 | 1 | 2 | 23096.261 | 0.86% |
| 1 | 1 | 3 | 9347.1714 | 0.35% |
| 1 | 1 | 4 | 6155.4873 | 0.23% |
| 1 | 1 | 5 | 280235.0921 | 10.41% |
| 1 | 1 | 6 | 1091639.805 | 40.55% |
| 1 | 1 | 7 | 73995.9797 | 2.75% |
| 1 | 1 | 8 | 340683.8341 | 12.66% |
| 1 | 1 | 9 | 237807.3983 | 8.83% |
| 1 | 1 | 10 | 312455.8553 | 11.61% |
| 1 | 1 | 11 | 170626.8178 | 6.34% |
| 1 | 1 | 12 | 90809.9909 | 3.37% |
| 1 | 1 | 13 | 14589.1937 | 0.54% |
| 1 | 1 | 14 | 33629.1696 | 1.25% |

| day of week | Day part | demo group | panel page view distribution % | Adjusted Census page views | calculated page views |
|---|---|---|---|---|---|
| 1 | 1 | 1 | 0.25% | 5,413,047 | 13,551 |
| 1 | 1 | 2 | 0.86% | 5,413,047 | 46,445 |
| 1 | 1 | 3 | 0.35% | 5,413,047 | 18,797 |
| 1 | 1 | 4 | 0.23% | 5,413,047 | 12,378 |
| 1 | 1 | 5 | 10.41% | 5,413,047 | 563,534 |
| 1 | 1 | 6 | 40.55% | 5,413,047 | 2,195,213 |
| 1 | 1 | 7 | 2.75% | 5,413,047 | 148,801 |
| 1 | 1 | 8 | 12.66% | 5,413,047 | 685,092 |
| 1 | 1 | 9 | 8.83% | 5,413,047 | 478,214 |
| 1 | 1 | 10 | 11.61% | 5,413,047 | 628,327 |
| 1 | 1 | 11 | 6.34% | 5,413,047 | 343,119 |
| 1 | 1 | 12 | 3.37% | 5,413,047 | 182,613 |
| 1 | 1 | 13 | 0.54% | 5,413,047 | 29,338 |
| 1 | 1 | 14 | 1.25% | 5,413,047 | 67,626 |

| day of week (1402) | day part (1404) | demo group (1408) | calculated page views (1602) |
|---|---|---|---|
| 1 | 1 | 1 | 33,551 |
| 1 | 2 | 1 | 0 |
| 1 | 3 | 1 | 94,640 |
| 1 | 4 | 1 | 15,003 |
| 1 | 5 | 1 | 303,185 |
| 2 | 1 | 1 | 53,277 |
| 2 | 2 | 1 | 3,456 |
| 2 | 3 | 1 | 45,670 |
| 2 | 4 | 1 | 0 |
| 2 | 5 | 1 | 0 |
| 3 | 1 | 1 | 21,305 |
| 3 | 2 | 1 | 0 |
| 3 | 3 | 1 | 0 |
| 3 | 4 | 1 | 0 |
| 3 | 5 | 1 | 57,987 |
| 4 | 1 | 1 | 23,476 |
| 4 | 2 | 1 | 0 |
| 4 | 3 | 1 | 16,155 |
| 4 | 4 | 1 | 0 |
| 4 | 5 | 1 | 5,488 |
| 5 | 1 | 1 | 25,411 |
| 5 | 2 | 1 | 0 |
| 5 | 3 | 1 | 0 |
| 5 | 4 | 1 | 3,453 |
| 5 | 5 | 1 | 9,666 |
| 6 | 1 | 1 | 31,721 |
| 6 | 2 | 1 | 0 |
| 6 | 3 | 1 | 7,763 |
| 6 | 4 | 1 | 0 |
| 6 | 5 | 1 | 1,917 |
| 7 | 1 | 1 | 33,978 |
| 7 | 2 | 1 | 3,853 |
| 7 | 3 | 1 | 250,049 |
| 7 | 4 | 1 | 9,414 |
| 7 | 5 | 1 | 0 |
| Total for demo group 1 : | | | 1,050,418 |

FIG. 16

| Demographic Group | Weighted Panel hits | Calculated Census Hits | Weighted Panel Sessions | Scaled Census Sessions |
|---:|---:|---:|---:|---:|
| 1 | 3,829,438 | 10,659,387 | 1,501,075 | 4,178,299 |
| 2 | 28,040,233 | 72,732,430 | 6,989,826 | 18,130,627 |
| 3 | 23,793,017 | 58,664,788 | 6,454,412 | 15,914,195 |
| 4 | 47,605,566 | 105,049,652 | 8,783,620 | 19,382,528 |
| 5 | 24,197,316 | 61,571,824 | 7,193,873 | 18,305,330 |
| 6 | 24,286,131 | 61,252,859 | 7,066,847 | 17,823,531 |
| 7 | 7,528,919 | 17,803,181 | 1,597,329 | 3,777,107 |
| 8 | 29,962,546 | 71,000,489 | 6,811,842 | 16,141,622 |
| 9 | 31,874,593 | 77,764,534 | 6,459,959 | 15,760,381 |
| 10 | 16,211,006 | 42,416,337 | 5,565,773 | 14,562,928 |
| 11 | 17,002,289 | 43,714,488 | 4,306,656 | 11,072,819 |
| 12 | 13,798,564 | 36,655,649 | 2,888,567 | 7,673,428 |
| 13 | 112,449 | 356,843 | 60,461 | 191,865 |
| 14 | 232,375 | 706,181 | 71,048 | 215,913 |
| 15 | 529,139 | 1,431,329 | 138,368 | 374,288 |
| 16 | 1,461,985 | 4,297,373 | 231,656 | 680,933 |

Column labels: 1408, 1704, 1706, 1708, 1702

FIG. 17

SYSTEMS, METHODS, AND ARTICLES OF MANUFACTURE TO MEASURE ONLINE AUDIENCES

RELATED APPLICATIONS

This patent claims priority to U.S. Provisional Patent Application No. 61/591,263, filed Jan. 26, 2012, the entirety of which is hereby incorporated by reference.

FIELD OF THE DISCLOSURE

The present disclosure relates generally to audience measurement and, more particularly, to systems, methods, and articles of manufacture to measure online audiences.

BACKGROUND

Online audience measurement based on panelist device metering and online audience measurement based on web site/web page tagging share the goal of measuring web traffic. In each case, the objective is to count or estimate the number of occasions when a person has the opportunity to see an element of online media (e.g., content, advertising, etc.). The objective may also include estimating a total unique audience exposed to a particular web site.

BRIEF DESCRIPTION OF THE DRAWINGS

FIG. 16 illustrates a calculation of a number of census streams for an example one of the demographic groups of FIG. 14 for a reporting period.

FIG. 17 illustrates a calculation of scaled census sessions for the example demographic groups of FIG. 14.

DETAILED DESCRIPTION

Figure 1:
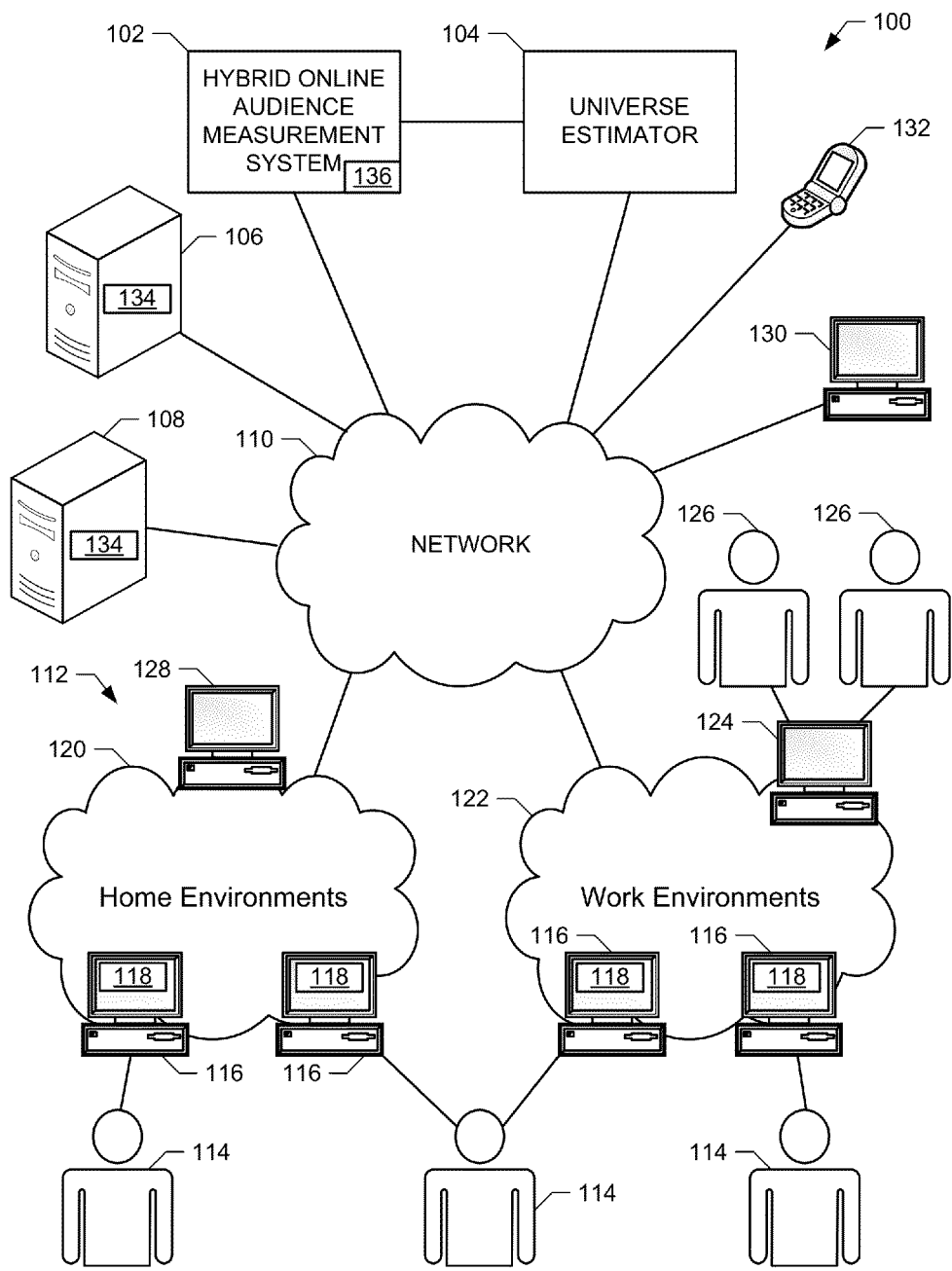
FIG. 1 is a block diagram illustrating a disclosed example system constructed in accordance with the teachings of this disclosure to measure online audiences.

Example systems, methods, apparatus, and articles of manufacture disclosed herein generate hybrid online audience measurement data via observational user-centric approaches using panel data (e.g., data obtained from a panel of participants such as panelists who have agreed to have their online browsing activity monitored) as core source data. In some examples, the panel data is calibrated using information derived from web site-centric census data, such as a web site server's counts of web page hits. Example observational user-centric approaches disclosed herein effectively correct for the weaknesses of known online audience measurement systems, enables reporting on any web site, and/or enable determination of additional analytics that are available from panel data that could not previously be determined from census-based data.

Example systems, methods, apparatus, and articles of manufacture disclosed herein provide a measurement of audience exposures and behaviors at previously unmeasured locations (e.g., locations outside of home and work environments). Examples of such previously unmeasured locations include usage on work computers shared by multiple users, secondary computers at home, public access locations (e.g., public library computers), mobile device usage, and/or other previously unmeasured devices. The audience from unmeasured locations is combined with the audience from measured locations to obtain a total unique audience. The combined measured and unmeasured audiences are more accurate than total unique online audiences obtained under previous methods.

In some examples, participating publishers and/or web sites insert or embed a tag within the source code (e.g., HTML code) of their respective content. The tag may include Java, Javascript, and/or other executable instructions, which cause the page view to be recorded by a data collection facility when the tag executes on the browser.

Tags are well known from Blumenau, U.S. Pat. No. 6,108,637, which is hereby incorporated by reference in its entirety. Because a tag is embedded in the HTML defining a webpage and/or referenced by a pointer in the HTML of a web page, the tag is executed whenever a browser renders the corresponding webpage. Typically, a tag will cause the browser to send a request for content to the data collection facility. The request may be thought of as a "dummy request," in that, unlike a conventional Internet request, the dummy request is typically not seeking to download content. Instead, the dummy request is actually being used to convey audience measurement information to the data collection facility. To this end, the payload of the dummy request carries identification information to be collected, compiled and/or analyzed by the data collection facility. The identification information may identify the webpage with which the tag is associated, the user device on which the webpage is accessed, the browser on which the webpage is accessed, the user, etc. In some examples, the data collection facility responds to the receipt of a dummy request by requesting a cookie from the requesting user device. In some such examples, if a cookie is not received (i.e., no cookie in the domain of the data collection facility is presently set on the user device), a cookie is set to facilitate identification of the device from webpage visit to webpage visit.

Tagging such as that described above is advantageous in that it enables the collection of census like data. In other words, because every browser that accesses the tagged webpage will respond to the tag by sending the dummy request, every access to the webpage will be known to the data collection facility. Moreover, the collection of this data does not require the use of a special browser, or of special metering software at the user devices. Rather, because a dummy request appears to a conventional commercially available browser (e.g., Firefox, Microsoft Explorer, etc) as any other request to retrieve Internet media (e.g., as a request to obtain content or advertisement material to be displayed as part of the webpage), any such browser will participate in the audience measurement process without requiring modification. As a result, tagging enables collection of this audience measurement data from panelists and non-panelists alike. Therefore, data collected via a tagging approach such as that described above, is described herein as census data.

As mentioned above, panelists are persons that have agreed to be monitored by, for example, an audience measurement entity such as The Nielsen Company (U.S.), LLC. Typically, such panelists provide detailed demographic information (e.g., race, age, income, home location, education level, gender, etc) when they register to participate in the panel. Additionally, panelists are provided with a meter to collect their media exposure. For example, a software meter, such as that disclosed in Coffey, U.S. Pat. No. 5,675,510, which is incorporated by reference in its entirety, may be downloaded onto the panelist's computer, smart phone, tablet and/or other browsing device. The meter will collect data indicating media access activities (e.g., web site names, dates/times of access, clickstream data, and/or other information identifying media (e.g., webpage content, advertisements, etc) to which the panelist is exposed. This data is uploaded, periodically or aperiodically, to the data collection facility. The data collected by a meter is referred to herein as panelist data. Panelist data is advantageous in that it is married to detailed demographic information since the panelist has provided their demographics as part of the registration and the activity data collected by the meter can, thus, be associated with that demographic information. When a panelist user device accesses a tagged page, the access will be logged by the meter and by the data collection facility via the tagging mechanism mentioned above. Thus, the panelist who accesses a tagged webpage provides a bridge between panelist data and census data.

Based on the panelist information received via the meters and the census information received via the tags, example systems and methods disclosed herein generate online audience measurement information (e.g., exposure statistics, demographics, etc.) using the following technique(s): (1) apply filtration techniques to the census-based data to remove undesirable traffic (e.g., automatic/programmatic refreshes of web pages, which causes additional hits on the web page, robot traffic, traffic originating from out-of-market geographic locations, etc.); (2) apply dictionary definitions to classify observed behaviors, web sites, brands, and/or channels; (3) determine the size and/or demographics of the population accessing the web pages from unmeasured locations; and (4) weight the measured and unmeasured location behaviors to represent the observed traffic.

Some example methods disclosed herein include obtaining panelist data corresponding to a plurality of panelists accessing web pages at measured locations, classifying the panelist data according to demographic information of the panelists, generating a virtual panel based on an estimate of web page access at unmeasured locations, and classifying page view data associated with the unmeasured locations based on data corresponding to the virtual panel.

Some example methods disclosed herein include assigning weights to a plurality of panelists based on first estimated characteristics, selecting a subset of the panelists based on the weights, re-weighting the selected panelists based on second estimated characteristics, and generating a virtual panel including the selected panelists as virtual panelists, wherein data collected from the selected panelists for the virtual panel are to be assigned weights based on the re-weighting.

Example apparatus disclosed herein include a panel data collector to collect panelist data corresponding to a plurality of panelists accessing web pages at measured locations, a virtual panel generator to generate a virtual panel based on an estimate of web page access at unmeasured locations, and an audience classifier to classify the panelist data according to demographic information of the panelists and to classify page view data associated with the unmeasured locations based on data corresponding to the virtual panel.

Example apparatus disclosed herein include a sample weighter to assign weights to a plurality of panelists based on first estimated characteristics, a sample selector to select a subset of the panelists based on the weights, and a sample re-weighter to re-weight the selected panelists based on second estimated characteristics, and to generate a virtual panel including the selected panelists as virtual panelists, wherein data collected from the selected panelists for the virtual panel are to be assigned weights based on the re-weighting.

As used herein, the following terms are defined to mean:

Uniform resource locator (URL) pattern—a set of similar URL instances that are classified together due to similarity of content and/or purpose.

URL instance—a unique URL string. A URL instance may differ from other URL instances belonging to a URL pattern based on particulars of the URL string, arguments in the URL string, and/or any other variation on the URL string that makes the URL unique.

Page view—used interchangeably herein with "exposure," refers to a web page or other online media (e.g., content, advertisements, video, image, audio, etc.) being provided (e.g., successfully transmitted) to a consumer or requester or device, with or without any indication that the provided web page was actually viewed by the consumer or requester.

Stream—also used interchangeably herein with "exposure," refers to providing an instance of streaming video and/or audio, similar to a page view except referring to different types of media.

Session—time spent on the internet from log on to log off, or a continuous surfing of a particular web site or multiple web sites by an individual.

Universe/population—totality of individuals/devices/households of interest, may be limited to only online individuals/devices/households.

Census-based data—data collected based on tags or another mechanism not limited to panel measurement.

Panelist—a person or group of persons that have agreed to have one or more aspects of their behavior (e.g., browsing activity, television viewing, etc) monitored.

Panelist data—data collected by a meter associated with a panelist.

Meter—a tool of any type (e.g., software and/or hardware) which collects data reflecting (or enabling the determination of) the identity of a user and/or the identity of media to which a person (e.g. a panelist) is exposed.

Media—any type of content and/or advertisement delivered via any type of delivery mechanism (e.g., webpages, television, video, audio, etc).

Measured site—a user device or physical location (e.g. a room) at which a meter is installed for collecting panelist data.

Unmeasured site—a user device or physical location which is not monitored by a meter.

Measured traffic—one or more accesses to media from one or more measured sites.

Unmetered traffic—one or more accesses to media from unmeasured sites.

Some examples below are described with reference only to page views for brevity. However, some examples disclosed herein are applicable to other types of media such as video streams, audio streams, and/or any other type of measurable online traffic.

FIG. 1 is a block diagram illustrating a disclosed example system 100 constructed in accordance with the teachings of this disclosure to measure online audiences. The example system 100 of FIG. 1 obtains measurements of online audience traffic from measured sites based on a panel of respondents or panelists, estimates online audience traffic from unmeasured sites based on census data, and estimates a total online audience for a web site based on the measured traffic from measured sites and the estimate of unmeasured traffic. The example system 100 may further provide demographic data regarding the estimated total online audience (e.g., across measured and unmeasured sites) for a web site.

The example system 100 of FIG. 1 includes a hybrid online audience measurement system 102, a universe estimator 104, measured web servers 106, 108, a network 110, and an online audience panel 112.

The example hybrid online audience measurement system 102 of FIG. 1 obtains (e.g., receives, retrieves, collects, etc.) panel-based online audience measurement data, census-based measurement data, and survey-based audience data, and determines online audiences (size and/or demographic composition) for specific media. The example hybrid online audience measurement system 102 of FIG. 1 may determine the online audiences for a designated reporting period for web sites of interest, such as web sites served by the example web servers 106, 108, and/or for aggregations of web sites belonging to channel, brand, and/or parent entities. The online audience measurement information generated by the example hybrid online audience measurement system 102 may be used to improve web site traffic, analyze web sites for purposes of purchasing advertising space, price advertisement placement, and/or any other use of online audience measurement information.

As described below, the example hybrid online audience measurement system 102 of FIG. 1 provides a more accurate measurement of online audiences than known audience measurement systems by combining the advantages of panel-based audience measurement with the advantages of or census-based audience measurement. For example, panel-based measurement has the advantage of more accurately representing a population or universe to be measured with respect to demographics and other useful statistics. In contrast, census-based audience measurement has the advantage of accurately measuring a total quantity of online traffic.

The example universe estimator 104 of FIG. 1 generates an estimate of online audiences, including the demographics, locations, and/or behaviors of online audiences. In some examples, the universe estimator 104 provides an independent and/or continuous enumeration study to provide current estimates of an online population. The example universe estimator 104 of FIG. 1 generates the estimates from an ongoing quarterly Internet universe enumeration survey. The example survey uses a sample of panelists recruited by the remote digit dial (RDD) methodology to collect Internet access information (e.g., web pages visited, time spent online, etc.) and/or demographic profiles (e.g., age, gender, etc.) of Internet users. The example universe estimator 104 of FIG. 1 collects Internet access information including estimates of online behavior in locations other than measured (e.g., work and/or home) environments of the panelists (e.g., at unmeasured locations such as coverage of work environment usage on computers shared by multiple users, secondary computers in home environments, public access locations, mobile usage, and previously unmeasured devices). Estimating the behavior corresponding to unmeasured locations improves overall response rates and reduces response biases that can be associated with non-proprietary, omnibus surveys.

The example web servers 106, 108 of FIG. 1 are communicatively coupled to the network 110 (e.g., the Internet) to serve web pages, video streams, and/or other web traffic to requesting devices. In the example system 100 of FIG. 1, the web servers 106, 108 serve web pages and/or video streams that have been tagged for measurement in accordance with the Blumenau methodology explained above. For example, the web servers 106, 108 may tag served web pages and/or video streams by including one or more monitoring instructions in each served web page and/or video stream. The example tag code may be active content (e.g., Javascript instructions, Java instructions, HTML5 instructions, etc.), which causes the device receiving the tagged web page and/or video stream to execute the instructions to browser information to the example hybrid online audience measurement system 102 (e.g., to a daemon 136 to store the browser information), to the web servers 106, 108, and/or to a different logging server.

The example online audience panel 112 of FIG. 1 provides measurements of online activities of panelists 114, such as web pages visited, video streams downloaded, and/or lengths of time spent browsing the web pages and/or playing video streams. The example panelists 114 are associated with respective computers 116, each of which is provided with an online monitor application (i.e., a meter 118) when the panelist 114 becomes a member of the online audience panel 112. The online monitor applications 118 are uniquely associated with respective user devices 116 and, thus, the activity data they collect can be mapped to the demographic characteristics of the panelists 114. Thus, the measured activities of the panelists 114 are correlated to the demographic characteristics of the panelists 114. The example online monitor applications 118 records the uniform resource locators (URLs) of the web pages and/or video streams received at the computers 116, keystrokes entered, items clicked on via a cursor, and/or any other interaction(s) performed by the panelists 114 with the computers 116. The example computers 118 also execute tags embedded in monitored web pages (e.g., monitoring instructions). In some examples, the tags are recognized by the meter 118. In other examples, the tags are logged by a daemon 136 at the hybrid online audience measurement system 102 and not recognized by the meter 118. The online monitor applications 118 transmit logs of online activities of the panelists to the example hybrid online audience measurement system 102. The logs may be transmitted at regular intervals (e.g., daily, weekly, biweekly, monthly, etc.), on demand, in response to an event or request, at predetermined times, and/or according to any other schedule(s) and/or condition(s).

User devices and/or locations monitored by one or more meters 118 are referred to as measured locations. Measured locations may include home environments 120 (e.g., computers located at the panelists' homes) and work environments 122 (e.g., computers located at the panelists' places of employment). The activities of a given panelist 114 may be measured in the home environments 120, the work environments 122, and/or both the home and work environment. As some businesses preclude installation of meters 118, some panelists are only monitored at their home environment and not at their work environments.

Online activities also occur outside of the home and work environments 120, 122. The example system 100 of FIG. 1 does not directly measure online activities performed in unmeasured locations, but these activities result in additional page views and/or video streams being served by the example servers 106, 108. Such example unmeasured locations that can generate web traffic include traffic generated in the work environment 122 via computers 124 that do not include a meter 118 (e.g., computers that are shared by multiple users 126 including non-panelists, panelists and non-panelists, etc.), secondary (e.g., non-primary) computers 128 in the home environments 120, computers 130 in public access locations (e.g., libraries, universities, etc.), mobile devices 132 (e.g., mobile phones, smartphones, tablet computers, etc.), and/or any other type(s) of unmeasured devices (e.g., Internet-connected appliances such as smart televisions, digital media players, game consoles, etc.). Activities (e.g., media exposures) in unmeasured locations can be performed by panelists and/or non-panelists.

The example web servers 106, 108 of FIG. 1 include server monitors 134 that measure the web traffic (e.g., web pages served, video streams served, etc.) served by the respective web servers 106, 108. The example server monitors 134 of FIG. 1 collect information such as the details of browsers or other applications requesting web pages and/or video streams from the servers 106, 108, the IP addresses of requesters, lengths of browsing sessions of persons on the servers 106, 108, and/or any other information that can be determined by the servers 106, 108 (e.g., via logging and/or analyzing requests for web pages and/or via cookies). The data collected via the server monitors 134 are considered to be server-based, server-centric data. Server-centric data is considered to have limitations. For example, such server side data is subject to manipulation (e.g., by the proprietor of the server and/or by robots or other devices programmed to repeatedly request data from servers). Thus, server-side data can over count page views. As web pages are often cached in user devices, a second or later access to a webpage may not involve a request to a server. Instead, the webpage may simply be retrieved from a local cache of the user device or served by an intervening proxy server. As such, server side data may additionally undercount page views.

In contrast to these potential overcounting and undercounting problems of server side data, the census data collected by the tagging system is accurate as every access to a tagged web page (whether from a cache or not), will cause the tag to fire, resulting in issuance of a dummy request and logging of an exposure to the tagged webpage.

Figure 2:
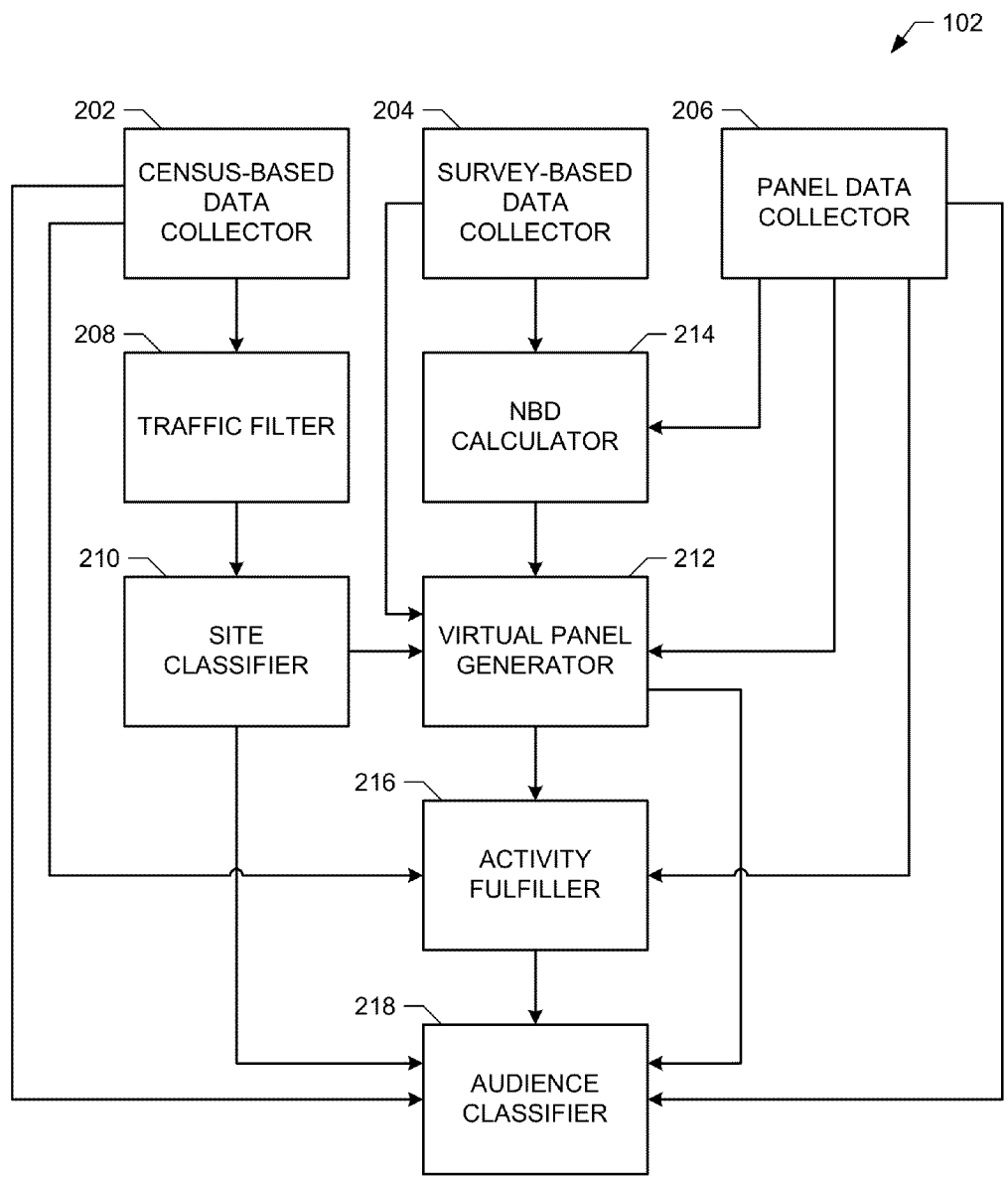
FIG. 2 is a block diagram of an example system that may be used to implement the hybrid online audience measurement system of FIG. 1.

FIG. 2 is a block diagram of an example implementation of the hybrid online audience measurement system 102 of FIG. 1. The example hybrid online audience measurement system 102 of FIG. 2 obtains input data including panel-based online activity data, an estimate of total and/or subsets of an online population, and/or census data measurements of traffic for particular web site(s). Based on the input data, the example hybrid online audience measurement system 102 of FIG. 2 classifies and/or outputs data reflecting an online audience for web site(s), channel(s), brand(s), parent(s), and/or any other organization unit of interest. In some examples, the hybrid online audience measurement system 102 classifies data reflecting an online audience for a particular reporting period, for day(s) of the week, and/or part(s) of the day.

The example hybrid online audience measurement system 102 of FIG. 2 obtains data from a census-based data collector 202, a survey-based data collector 204, and a panel data collector 206. The example hybrid online audience measurement system 102 may obtain the data via a network (e.g., the network 110 of FIG. 1), via manual data entry (e.g., entry of survey responses), and/or using any other method of receiving data.

The example census-based data collector 202 of FIG. 2 receives census-based traffic information. Census-based data may be obtained from, for example, server logs generated by the server monitors 134, tag-based data collected by the daemon 136, and/or any other source of census data. The census-based traffic information may include data collected from dummy requests made to the census-based data collector 202 resulting from the execution of tags in tagged web pages and/or statistics collected via the server monitors 134 based on server logs reflecting requests for web pages, session measurements, and/or other traffic information that can be collected via the server monitors 134. In some examples, the census-based data collector 202 implements the example daemon 136 to collect, parse, and/or store data received from the devices 116, 124, 128, 130, 132 of FIG. 1 in response to execute of tag instructions.

The example survey-based data collector 204 of FIG. 2 receives survey-based behavior information, such as "universe estimates" of the total audience and/or subsets of an online audience (e.g., from the example universe estimator 104 of FIG. 1). In the examples of FIGS. 1 and 2, the universe estimates are obtained from personal interviews, which may be conducted via telephone. The interviews provide Internet access information and demographic profiles of Internet users, including estimates for measured locations such as work and home, and for unmeasured locations such as outside of work and home. Survey data is based on the respondent's ability to accurately recall their activities and willingness to truthfully report.

The example panel data collector 206 of FIG. 2 receives panelist data including page view data representative of panel activities (e.g., collected via the monitoring applications 118 such as meters). The panelist data may include web sites visited (e.g., URLs), sessions including multiple URLs, timestamps reflecting time/date of occurrence of web site requests and/or sessions, demographic characteristics of the panelists, and/or any other information that may be collected via the online monitor applications of FIG. 1. The example panel data collector 206 of the illustrated example filters the received panelist data according to rules. Additionally or alternatively, the example panel data collector 206 may sort the received panelist data according to demographic categories, day-of-week information, and/or time-of-day information to obtain more precise data.

The example panel data collector 206 of FIG. 2 weights panelist web site requests and/or sessions based on a determined representation of the panelists relative to the universe. For example, the behavior of a first panelist who represents a larger portion of the universe than a second panelist will be weighted more heavily (e.g., multiplied by a larger factor) than the activities of the second panelist. The example panel data collector 206 of FIG. 2 determines estimated activities for individual measured locations and for the measured locations in general (e.g., by removing overlapping or duplicated audience entries). An individual panelist may be counted in multiple measured locations (e.g., at home and at work), so the panelist's presence in the multiple locations is counted for by removing an apparent duplicate audience member.

The example hybrid online audience measurement system 102 of FIG. 2 processes the census-based traffic information to clean and/or classify the data. To this end, the example hybrid online audience measurement system 102 includes a traffic filter 208 and a site classifier 210.

Many web sites (e.g., web servers 106, 108) receive traffic (e.g., page views) that is generated by non-human and/or indirectly human activities (e.g., robots, web crawlers web spiders, automatic page refreshes, and/or other traffic not generated by a person consciously or intentionally requesting a web site). The example traffic filter 208 cleans the census-based information (e.g., server logs and/or tag-based counts) to avoid counting irrelevant data and/or other non-human activity. For example, the traffic filter 208 of FIG. 2 applies a list of known user agents, known IP addresses, and/or activity duration thresholds to the census-based information to identify and remove non-human traffic. The list of known user agents and/or known IP addresses may be obtained from the Interactive Advertising Bureau (IAB)/Audit Bureau of Circulations Electronic (ABCe) International Spider & Robot List. In some examples, the traffic filter 208 further applies activity-based filters to detect non-human traffic.

The example traffic filter 208 of FIG. 2 categorizes the census-based data by geographical region (e.g., state, region, nation, continent, etc.) using the IP addresses of requesting devices. Thus, international traffic to the web servers 106, 108 may be removed if not of interest for a particular use. The example traffic filter 208 of FIG. 2 also removes automatic web page refreshes (e.g., web page code that causes a request for an updated version of the same web page to be sent, typically at some interval after the initial web page is received). Because the example monitor applications 118 recognize tags, the example panel data collector 206 may estimate the auto-refresh page view activity by identifying the human-requested page views and distinguish the page views resulting from auto-refreshing. For example, the monitor applications 118 (e.g., meters) may identify web page refreshes (e.g., web page requests) by tracking browser activity and determining whether corresponding a panelist action (e.g., button clicks, keystrokes, etc.) occurred to cause the web page refresh and/or whether browser execution of instructions in the web page source code causes the web page refresh.

The human page views and the auto-refresh page views may be converted to a rate or ratio, which the example traffic filter 208 of FIG. 2 applies to the census-based traffic (e.g., page views) to reduce or remove page views attributable to auto-refreshes. For example, the auto-refresh rate may be determined from panel-based data for a URL pattern by a day of the week and a day part, as the ratio of number of auto-refresh generated page views to all page views. The auto-refresh rate or ratio is then applied to the census-based page views for a selected URL pattern (URL page views) (e.g., which have been cleaned of other non-human and/or non-geographic market traffic) to determine an adjusted or cleaned number of census-based URL page views (adjusted URL page views). An example calculation is shown in the following equation: Adjusted URL page views=URL page views*(1−auto-refresh rate).

The example site classifier 210 of FIG. 2 receives the filtered census-based traffic information (e.g., the adjusted URL page views for the URLs of interest) and classifies the URLs (e.g., web pages and/or video streams) into categories (e.g., sports, retail, etc.). For example, the site classifier 210 of FIG. 2 applies a dictionary of classifications to assist in classifying and/or modeling panelist activities by the categories. The example site classifier 210 classifies in multiple ways, such as brands, parent entities, channels, Internet domains, Internet sub-domains, and/or in any other way. For example, a parent may include multiple brands, each of which may include multiple channels.

Figure 3:
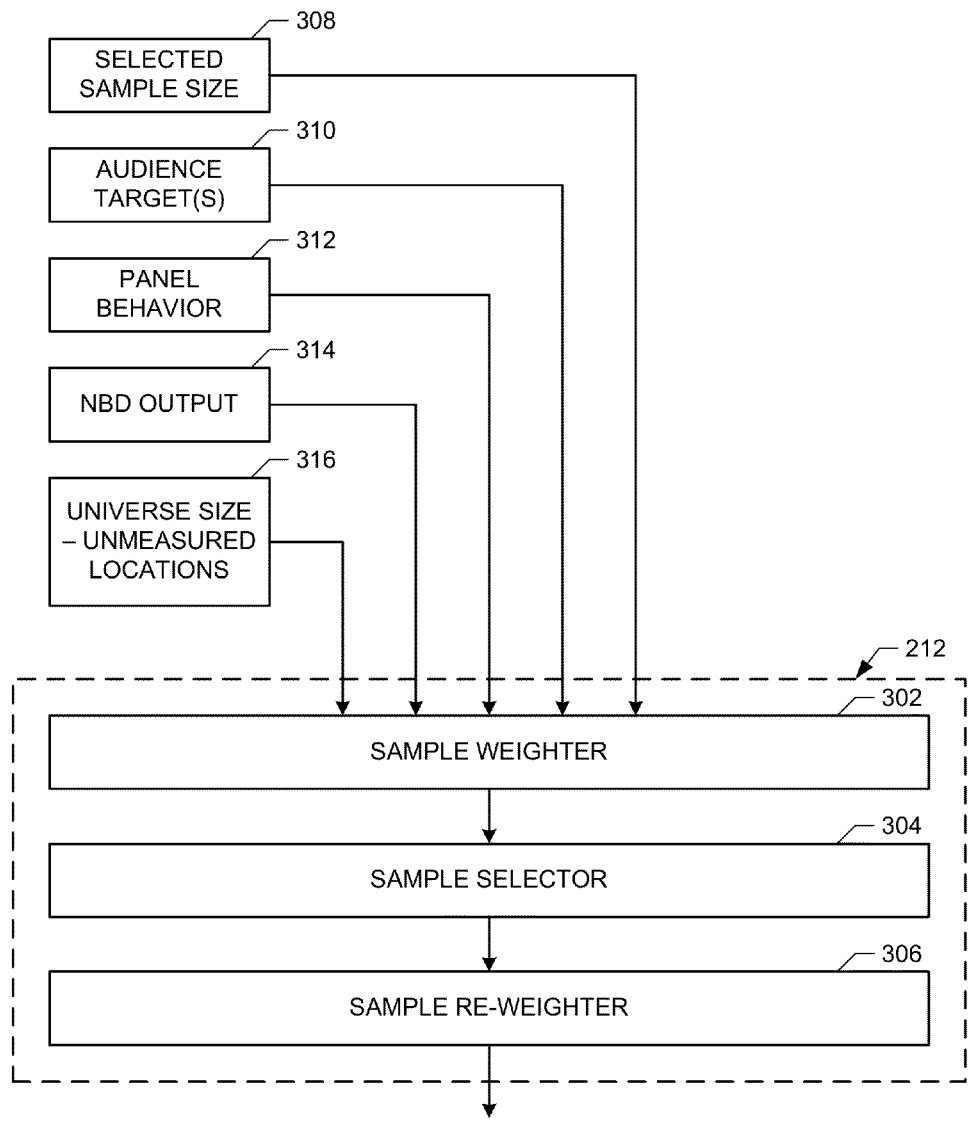
FIG. 3 is a block diagram of an example virtual panel generator to implement the virtual panel generator of FIG. 2.

The example hybrid online audience measurement system 102 of FIG. 2 further includes a virtual panel generator 212. FIG. 3 is a block diagram of an example implementation of the example virtual panel generator 212 of FIG. 2. While the example panelist data and the example census data may be used to effectively estimate and/or classify online audiences in measured locations (e.g., the work and home environments 120, 122 of FIG. 1), census-based traffic often indicates that increasing amounts of traffic originate from unmeasured locations. The example virtual panel generator 212 generates a virtual panel to enable more accurate estimation of traffic from unmeasured locations than was previously possible. Example unmeasured locations may include, but are not limited to, shared computers in work environments, secondary or tertiary computers in home environments, computers in public access locations, mobile devices, and/or other devices not measured and/or not measurable via panel-based methods.

In the example of FIG. 2, a negative binomial distribution (NBD) calculator 214 determines a number of people who access the web site(s) from unmeasured locations. The negative binomial distribution is a discrete probability distribution of a number of successes r in a sequence of n independent Bernoulli trials (the outcome of each Bernoulli trial being defined as a success or a failure). The example NBD calculator 214 may consider a success to be a page view of a URL by a particular panelist in a trial of whether a panelist visits the URL. The example NBD calculator 214 of FIG. 2 determines characteristics (e.g., size and/or demographic composition) of an audience who access web pages only from unmeasured locations (e.g., are not represented by the panelist data measuring measured locations). To determine the audience at unmeasured locations, the example NBD calculator 214 of FIG. 2 receives weighted audience characteristic data for each of multiple demographic groups determined from the panelist data, weighted session data for each of the demographic groups determined from the panelist data, numbers of cleaned sessions for each of the demographic groups determined from the census-based data after processing by the traffic filter 208, and a universe estimate of the audience size determined from survey data. The demographic groups may define subsets of a universe or population. Accordingly, the example NBD calculator 214 of the illustrated example performs multiple NBD calculations corresponding to multiple demographic groups. The example NBD calculator 214 of FIG. 2 determines variables to be used in an NBD process and calculates the NBDs for the demographic groups based on the variables. Example processes (e.g., computer readable instructions) to calculate the NBD and the input variables to the NBD are described below.

Once the number of persons who access the web sites solely from unmeasured locations is determined (e.g., from the NBD calculator 214), the example virtual panel generator generates a virtual panel to represent the audience for the unmeasured locations. The example virtual panel generator 212 of FIG. 2 generates the virtual panel (e.g., the unmeasured location sample) by selecting a subset of panelists of measured locations (e.g., home and work environments), duplicating the selected panelists (and their corresponding online behaviors) to form an unmeasured location sample. In the example of FIG. 2, the duplicated versions of the panelists are provided with separate identifiers to simulate or represent the duplicated panelists as actual panelists. The example virtual panel generator 212 selects the subset of the panelists to have a demographic composition similar to an estimated demographic distribution of the unmeasured location audiences, and so that the activities of the duplicated panelists represent the surveyed behavior of the unmeasured location audiences. The example virtual panel generator 212 may select all or a portion of the activities of the duplicated panelists to meet volume targets (numbers of page views to the web sites calculated based on differences between panelist data and census-based data).

The example virtual panel generator 212 of FIG. 3 includes a sample weighter 302, a sample selector 304, and a sample re-weighter 306. The example virtual panel generator 212 receives a selected sample size 308 of the resulting virtual panel (e.g., a value input by an operation reflecting a desired panel size such as 10,000 members), audience target(s) 310 (e.g., a difference between a census-based audience and a panel based audience and/or an estimated number of page views resulting from the unmeasured locations) for one or more demographic groups, panel behavior data 312 (e.g., online activities), NBD output 314 (e.g., calculations from the NBD calculator 214 of FIG. 2), and an estimated universe size for unmeasured locations 316.

The selected sample size 308 of FIG. 3 represents a number of panelists to be selected (e.g., by the sample selector 304) to form the virtual panel. The selected sample size 308 may be at least as large as a number of panelists needed to represent the demographics and/or activities of an audience that only accesses web pages from unmeasured locations (e.g., persons who are not active online in measured locations such as home or work environments).

The example panelist behavior data 312 (e.g., a subset of panelist data) includes data representing the activities for each of the panelists to be weighted and/or considered for the virtual panel. The example sample weighter 302 and/or the example sample re-weighter 306 of FIG. 3 compare the activities reflected in the panel behavior data 312 to activities in the unmeasured locations to determine weights for the panelists.

The example audience target(s) 310 of FIG. 3 (e.g., an expected or estimated number of audience members) are calculated as a difference between a census-based audience estimate (e.g., an estimate of a total audience for one or more web pages based on the cleaned census-based page views) and a panel-based audience estimate (e.g., an estimate of an audience at measured locations). The audience target 310 of FIG. 3 is an estimated or expected number of audience members with online activity occurring only in unmeasured locations. The panel-based audience estimate is calculated by the NBD calculator 214 of FIG. 2. The census-based audience estimate is calculated based on the census-based web traffic (e.g., a number of page requests or impressions, a number of video streams, etc.) and a panel-based page view volume calculation (e.g., web page requests or impressions and panelist sessions). For example, the number of page views determined for a URL pattern from the cleaned census-based data may be divided by the average number of page views per panelist (e.g., audience member) to determine an estimated number of audience members for the census-based data. In some examples, the audience target(s) 310 include a total audience target for an entire population, and audience targets for individual subsets of the population corresponding to demographic subgroups.

The universe size for unmeasured locations 316 is determined in the illustrated example based on a total universe size (e.g., a total online population determined from surveys) and a total audience for measured locations (e.g., an audience from all measured locations determined from the panelist data). In the example of FIG. 3, the universe size for unmeasured locations 316 is the difference between the total universe size and the total audience for the measured locations.

The example survey-based data collector 204 of FIG. 2 provides the virtual panel generator 212 with an estimated size and demographic composition of the population accessing the web sites from unmeasured locations. The census-based data collector 202 provides census-based page view information and the panel data collector 206 provides panel-based information to the virtual panel generator 212. The panelist data and the census data provide guidance on the page views from the unmeasured locations on a site-by-site basis, such as page view volume discrepancies between estimates of page views from measured locations and page views measured by the census-based data collector 202 (e.g., via the server monitors 134 and/or the daemon 136).

To create the virtual panel (e.g., the unmeasured location sample), the example virtual panel generator 212 (e.g., via the sample weighter 302) applies or assigns a weight to each of the panelists. The sample weighter 302 generates the weights to represent the desirability or suitability of each of the example panelists for representing an audience in unmeasured locations. For example, the sample weighter 302 may determine desirability based on the audience targets 310, including demographic targets (e.g., a estimated demography of the unmeasured locations) and/or entity targets (e.g., an estimated unique audience 314 in the unmeasured locations determined by the NBD calculator 214, an estimated difference in page views between the census-based data and the panelist data). Using Calmar weighting, the example sample weighter 302 of FIG. 2 assigns a weight to each panelist based on the panelist's individual online activities and/or demographic characteristics compared to the demographic and/or entity targets. A weight is determined for each panelist when the Calmar weighting converges. The weight designates how closely the panelist represents a typical person in an unmeasured location. Panelists that are similar to estimated demographic profiles and/or behavioral profiles of persons accessing a web site from an unmeasured location are given higher weights.

After weighting, the example sample selector 304 of FIG. 3 selects a number of the panelists for inclusion in the virtual panel using random selection. The weights of each of the panelists, calculated by the sample weighter 302, are used as probabilities of selection (or inclusion). A panelist having a high weight will have a higher likelihood of selection by the sample selector 304. The example virtual panel generator 212 may randomly select a number of the panelists (e.g., a fixed number) using, for example, the FastCube method. Selected panelists and their corresponding demographic, behavioral, and/or other data are duplicated to create a virtual panelist while retaining the original panelist in the panel.

After selecting (e.g., generating) the virtual panelists, the example sample re-weighter 306 of FIG. 3 re-weights the selected virtual panelists against the demographic targets and/or audience targets. The example targets used in the re-weighting can be the same as during the first weighting or different from those used in the first weighting, depending on how much is known about the audience and/or behaviors in the unmeasured locations. The example virtual panel generator 212 outputs a virtual panel including the set of selected panelists and corresponding weights to represent the audience and/or behavior targets.

The example panelist data (e.g., the behavior information of the panelists), the census-based data, and the virtual panel (e.g., panelist data for panelists selected and/or duplicated for the virtual panel) are provided to an activity fulfiller 216. The example activity fulfiller 216 of FIG. 2 fulfills (estimates the origin of) any remaining activity between measured and unmeasured panel volume and the measured census-based volume. To fulfill the virtual panel activity, the example activity fulfiller 216 determines an amount of activity to fulfill (e.g., estimate, match) the activities collected by the census-based data collector 202, but not accounted for by the panelist data and the virtual panel, for each of the demographic groups for each day part. The discrepancy in activity may result from unmeasured activities in measured environments (e.g., activities on devices that are located in home and/or work environments but are not metered). The example activity fulfiller 216 then randomly and/or probabilistically duplicates instances of panelist activity (e.g., sets of page views and/or video streams logged for panelists, online sessions of panelists, etc.) to compensate for the differences in activity.

The example activity fulfiller 216 of FIG. 2 generates and/or outputs a report of the audience, the demographics of the audience, and/or the determined activities of the audience for measured URLs, measured sets of similar URLs, measured brands, measured channels, measured parent entities, and/or for any other measured entity or sub-entity.

The example hybrid online audience measurement system 102 of FIG. 2 further includes an audience classifier 218. The example audience classifier 218 receives the determined audiences for measured locations (e.g., from the panel data collector 206) and for unmeasured locations (e.g., from the virtual panel generator 212), and additional activity not represented by the panels (e.g., from the activity fulfiller 216). The example audience classifier 218 further receives page view data from the example census-based data collector 202 and/or cleaned page view data from the site classifier 210. The audience classifier 218 of FIG. 2 classifies a first portion of the page view data based on the panelist data (e.g., for measured locations) and classifies a second portion of the page view data based on the virtual panel (e.g., for unmeasured locations). Classifying the page view data may include generating statistics and/or reports to classify audiences and/or traffic for combinations of URLs and/or entities, day parts, days of week, and/or any other classification. The example audience classifier 218 of FIG. 2 estimates an audience for one or more web sites during a reporting period. For example, the audience classifier 218 of the illustrated example estimates numbers of unique audience members of web sites and the demographics of web site audiences.

While an example manner of implementing the hybrid online audience measurement system 102 of FIG. 1 has been illustrated in FIG. 2 and an example manner of implementing the virtual panel generator 212 of FIG. 2 has been illustrated in FIG. 3, one or more of the elements, processes and/or devices illustrated in FIGS. 1-3 may be combined, divided, re-arranged, omitted, eliminated and/or implemented in any other way. Further, the example hybrid online audience measurement system 102, the example universe estimator 104, the example web servers 106, 108, the example monitoring applications 118, the example server monitors 134, the example census-based data collector 202, the example survey-based data collector 204, the example panel data collector 206, the example traffic filter 208, the example site classifier 210, the example virtual panel generator 212, the example NBD calculator 214, the example activity fulfiller 216, the example audience classifier 218, the example sample weighter 302, the example sample selector 304, the example sample re-weighter 306 and/or, more generally, the example system 100, the example hybrid online audience measurement system 102, and/or the example virtual panel generator 212 of FIGS. 1, 2, and/or 3 may be implemented by hardware, software, firmware and/or any combination of hardware, software and/or firmware. Thus, for example, any of the example hybrid online audience measurement system 102, the example universe estimator 104, the example web servers 106, 108, the example monitoring applications 118, the example server monitors 134, the example census-based data collector 202, the example survey-based data collector 204, the example panel data collector 206, the example traffic filter 208, the example site classifier 210, the example virtual panel generator 212, the example NBD calculator 214, the example activity fulfiller 216, the example audience classifier 218, the example sample weighter 302, the example sample selector 304, the example sample re-weighter 306 and/or, more generally, the example system 100, the example hybrid online audience measurement system 102, and/or the example virtual panel generator 212 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example hybrid online audience measurement system 102, the example universe estimator 104, the example web servers 106, 108, the example monitoring applications 118, the example server monitors 134, the example census-based data collector 202, the example survey-based data collector 204, the example panel data collector 206, the example traffic filter 208, the example site classifier 210, the example virtual panel generator 212, the example NBD calculator 214, the example activity fulfiller 216, the example audience classifier 218, the example sample weighter 302, the example sample selector 304, and/or the example sample re-weighter 306 are hereby expressly defined to include a tangible computer readable storage medium such as a memory, DVD, CD, Blu-ray, etc. storing the software and/or firmware. Further still, the example system 100, the example hybrid online audience measurement system 102, and/or the example virtual panel generator 212 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Flowcharts representative of example machine readable instructions for implementing the hybrid online audience measurement system 102 of FIGS. 1-3 are shown in FIGS. 4-13B. In these examples, the machine readable instructions comprise program(s) for execution by a processor such as the processor 1812 shown in the example processing platform 1800 discussed below in connection with FIG. 18. The program may be embodied in software stored on a tangible computer readable storage medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 4-13B, many other methods of implementing the example hybrid online audience measurement system 102 and/or the example virtual panel generator 212 may alternatively be used. For example, the order of execution of the blocks may be changed, and/or some of the blocks described may be changed, eliminated, or combined.

As mentioned above, the example processes of FIGS. 4-13B may be implemented using coded instructions (e.g., computer readable instructions) stored on a tangible computer readable storage medium such as a storage drive, a storage disc, a hard disk drive, a flash memory, a read-only memory (ROM), a compact disk (CD), a digital versatile disk (DVD), a Blu-ray disc, a cache, a random-access memory (RAM) and/or any other storage device or storage disc in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIGS. 4-13B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage device or storage disc in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disc irrespective of the duration of storage and to exclude propagating signals. As used herein, when the phrase "at least" is used as the transition term in a preamble of a claim, it is open-ended in the same manner as the term "comprising" is open ended.

Figure 4:
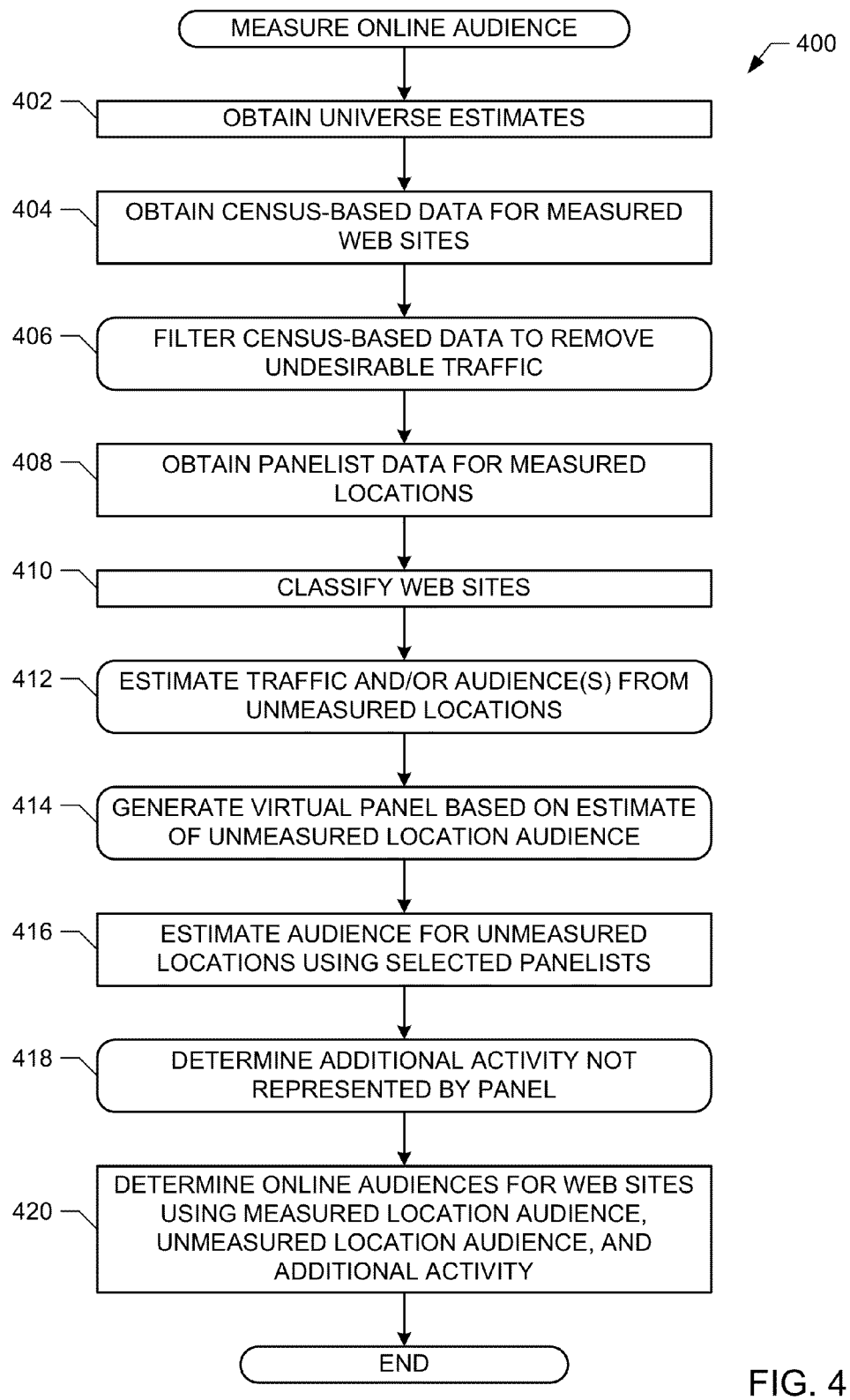
FIG. 4 is a flowchart representative of example computer readable instructions that may be executed to implement the hybrid online audience measurement system of FIGS. 1 and/or 2 to measure an online audience of a web site.

FIG. 4 is a flowchart representative of example computer readable instructions 400 that may be executed to implement the hybrid online audience measurement system 102 of FIGS. 1 and/or 2 to measure an online audience of a web site.

The example instructions 400 of FIG. 4 includes obtaining (e.g., receiving, collecting) universe estimates (e.g., via the survey-based data collector 204 of FIG. 2) (block 402). The example universe estimates include an estimate of an online population (e.g., a number of persons who are capable of accessing web sites or another definition of an online population). The universe estimates may further include surveyed behaviors of the online population.

The example hybrid online audience measurement system 102 (e.g., via the census-based data collector 202) obtains server-centric or census-based data for web sites (block 404). The census-based data may include tag-based data and/or measurements of web site traffic performed by the example server monitors 134 of FIG. 1. The example hybrid online audience measurement system 102 filters (e.g., via the traffic filter 208) the census-based data to remove undesirable traffic (block 406). Examples of undesirable (or non-representative) traffic include non-human traffic such as robots or spiders, traffic from non-representative geographical locations, and/or traffic resulting from automatic page refreshes. Example computer readable instructions to implement block 406 are described below with reference to FIG. 5. The example hybrid online audience measurement system 102 obtains panelist data (e.g., via the panel data collector 206 of FIG. 2) for measured locations (block 408). Example panelist data includes demographic and online behavior information for individual panelists.

The example hybrid online audience measurement system 102 classifies the web site(s) in the panelist data, the census-based data, and/or the survey-based data (e.g., via the site classifier 210 of FIG. 2) (block 410). For example, the site classifier 210 may classify URLs, sets of similar URLs, channels, brands, parent entities, and/or any other organization of web sites using a dictionary of classifications (e.g., sports, retail, etc.).

The example hybrid online audience measurement system 102 estimates traffic and/or audiences from unmeasured locations (e.g., via the NBD calculator 214 of FIG. 2) (block 412). The example NBD calculator 214 estimates traffic and/or audiences from unmeasured locations based on the census-based data, the panelist data, and the survey-based data. Example computer readable instructions to implement block 412 are described below with reference to FIGS. 6-8.

The example hybrid online audience measurement system 102 generates a virtual panel based on the estimate of the unmeasured location audience (e.g., via the virtual panel generator 212 of FIG. 2) (block 414). For example, the virtual panel generator 212 of FIG. 2 may weight the panelists included in the panelist data based on demographic targets, audience targets, and/or activity targets, and based on the demographic characteristics and/or online behaviors of the panelists. The example virtual panel generator 212 selects a number of the panelists based on the weights for inclusion in a virtual panel. Example computer instructions to implement block 414 are described below with reference to FIG. 9.

The example hybrid online audience measurement system 102 estimates an audience for unmeasured locations using the selected panelists (e.g., via the virtual panel generator 212 of FIG. 2) (block 416). For example, the virtual panel generator 212 may re-weight the panelists selected in block 414 to represent the demographic targets, audience targets, and/or activity targets. The combination of re-weighted panelists in the virtual panel may provide an estimated audience for unmeasured locations including demographic characteristics of the estimated audience.

The example hybrid online audience measurement system 102 determines additional activity not represented by the panel measurements (e.g., via the activity fulfiller 216 of FIG. 2 (block 418). For example, the activity fulfiller 216 may determine a difference between a census-based measurement of web site traffic and a panel-based estimation of web site traffic (e.g., measured panel and virtual panel). The example activity fulfiller 216 generates and/or classifies additional audience activity based on actual panelist activity to represent the difference. The difference in activity may include activity performed in measured locations (e.g., home environments, work environments) but not measured or represented by the panel. Example computer readable instructions to implement block 418 are described below with reference to FIGS. 10A and 10B and/or 11A and 11B.

The example hybrid online audience measurement system 102 determines online audience(s) for web sites using the measured location audience, the unmeasured location audience, and the additional activity (block 420). In some examples, the hybrid online audience measurement system 102 classifies the online audiences and/or determines portions of the online audience corresponding to particular criteria, such as demographic groups, geographic locations, day parts, days of the week, and/or other criteria. In some examples, the hybrid online audience measurement system 102 classifies page view data associated with the unmeasured locations based on data corresponding to the virtual panel. The example instructions 400 of FIG. 4 may then end and/or iterate to determine additional online audiences.

Figure 5:
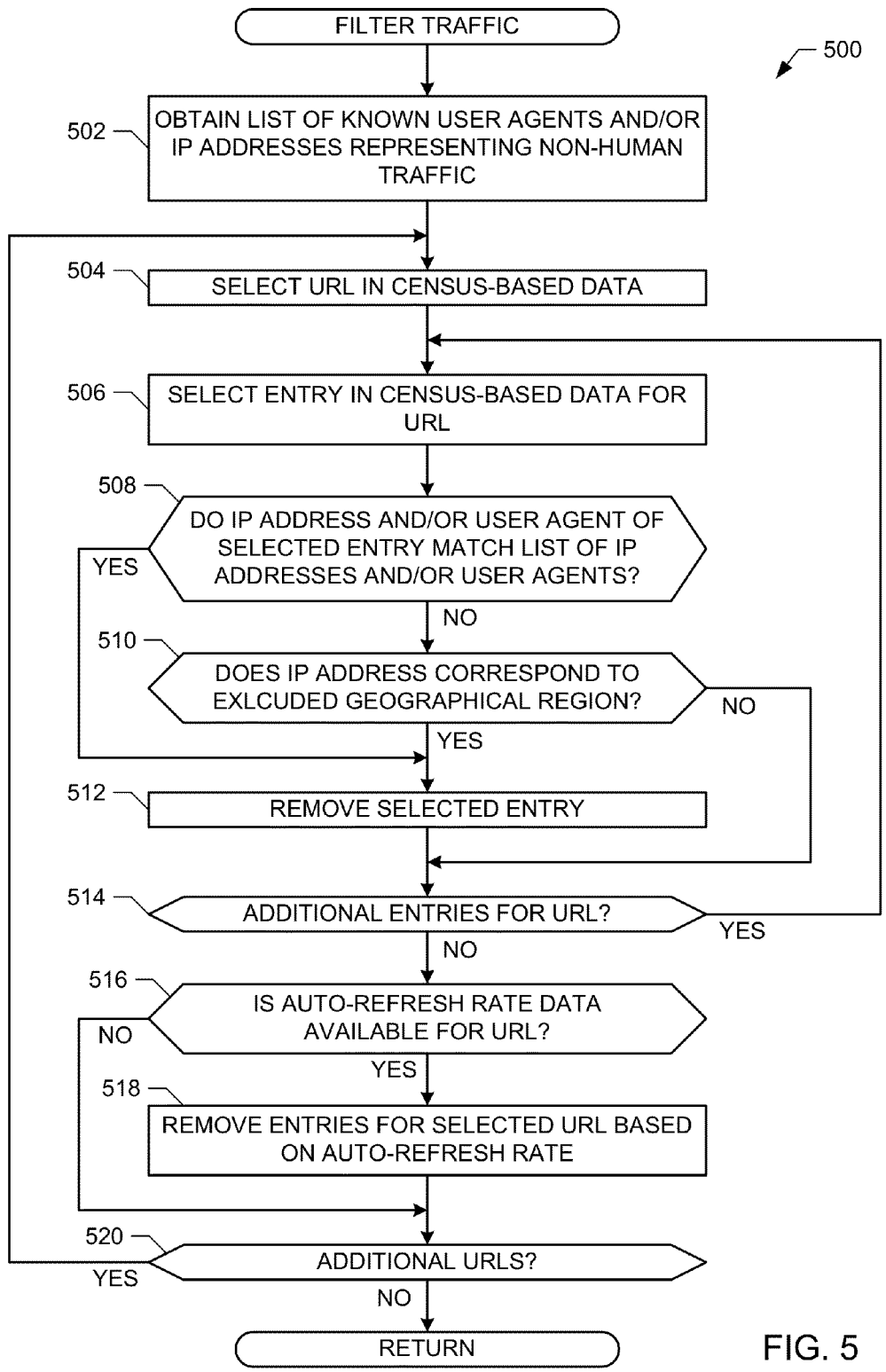
FIG. 5 is a flowchart representative of example computer readable instructions which, when executed, cause a processor to filter non-human traffic from a set of traffic data.

FIG. 5 is a flowchart representative of example computer readable instructions 500 which, when executed, cause a processor to filter traffic (e.g., page views) from a set of traffic data (e.g., page view data). The example instructions 500 of FIG. 5 may be executed by the example traffic filter 208 of FIG. 2 to perform block 406 of FIG. 4. The example instructions 500 are performed subsequent to obtaining census-based data for measured web sites (e.g., traffic logs generated by the server monitors 134 for the web servers 106, 108 of FIG. 1).

The example traffic filter 208 obtains a list of known user agents and/or IP addresses representing non-human traffic (block 502). For example, the traffic filter 208 may obtain the IAB/ABCe International Spider & Robot List. The example traffic filter 208 selects a URL in the census-based data (block 504). The census-based data may have multiple entries (e.g., page views, video streams) for the URL and/or one or more variations of the URL that correspond to a same URL pattern. The example traffic filter 208 selects an entry in the census-based data for the selected URL (block 506). Each example entry includes information about the page view or video stream, such as the IP address of the requesting device, a user agent used to request the device, a time at which the page view was requested, and/or other information.

The example traffic filter 208 determines whether the IP address and/or the user agent of the selected entry match the list of user agents and/or IP addresses (block 508). If there is not a match, the example traffic filter 208 determines whether the IP address corresponds to a geographical region to be excluded from the online audience measurement (e.g., traffic from another country) (block 510). For example, the traffic filter 208 may compare the IP address of the selected entry to a mapping of IP addresses to geographical regions. If the IP address and/or the user agent of the selected entry corresponds to the list of non-human IP addresses and/or user agents (block 508) of if the IP address of the selected entry corresponds to an excluded geographical region (block 510), the example traffic filter 208 removes the selected entry from the census-based data (block 512). In some examples, the traffic filter 208 archives the selected entry or otherwise marks the selected entry to not be used for determining the online audience.

After removing the selected entry (block 512), or if the selected entry is not matched to the list of IP address and/or user agents (block 508) and does not correspond to an excluded geographical region (block 510), the example traffic filter determines whether there are additional entries for the selected URL (or URL pattern) (block 514). If there are additional entries (block 514), control returns to block 506 to select another entry in the census-based data. When there are no additional entries for the selected URL (e.g., the non-human and/or excluded geographical region entries have been removed) (block 514), the example traffic filter 208 determines whether there is an auto-refresh rate available for the URL (or URL pattern) (block 516). For example, an auto-refresh rate may be determined for the URL based on panel-based observations of an average number of automatic refreshes of the URL.

If there is an auto-refresh rate available (block 516), the example traffic filter 208 removes a number of entries for the selected URL based on the auto-refresh rate (block 518). For example, the traffic filter 208 may remove a number of the entries for the URL proportional to the average number of automatic refreshes per human request. After removing the entries (block 518), or if there is no auto-refresh rate data available for the URL (block 516), the example traffic filter 208 determines whether there are additional URLs in the census-based data (block 520). If there are additional URLs (or URL patterns) (block 520), control returns to block 504 to select another URL from the census-based data. When there are no more URLs (block 520), the example instructions 500 of FIG. 5 end and control returns to block 408 of FIG. 4.

Figure 6:
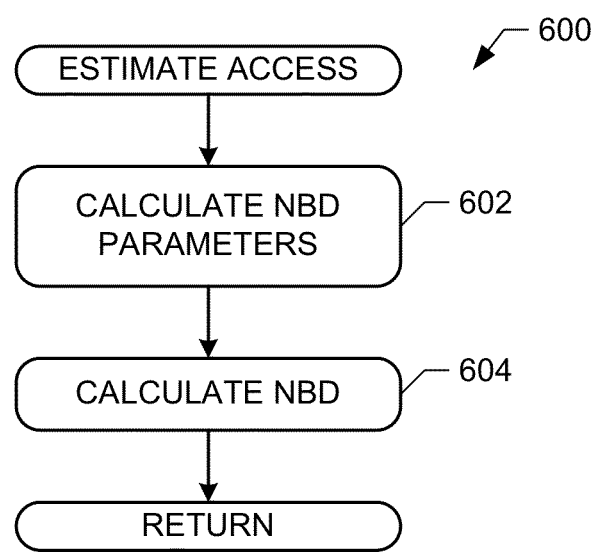
FIG. 6 is a flowchart representative of example computer readable instructions which, when executed, cause a processor to estimate access to a web site from unmeasured locations.

FIG. 6 is a flowchart representative of example computer readable instructions 600 which, when executed, cause a processor to estimate access to a web site from unmeasured locations. The example instructions 600 of FIG. 6 may be performed by the example NBD calculator 214 of FIG. 2 to implement block 412 of FIG. 4. In some examples, the instructions 600 cause the NBD calculator 214 to estimate an audience of persons with access only from unmeasured locations.

The example NBD calculator 214 of FIG. 2 calculates NBD parameters (block 602). For example, the NBD calculator 214 may determine whether a Poisson condition exists and/or calculate variables to be used in the NBD process for each of the demographic groups to be measured. Example instructions for calculating the NBD parameters are described below with reference to FIG. 7. Using the calculated parameters, the example NBD calculator 214 calculates an NBD for the demographic groups (block 604). Example instructions for calculating the NBD are described below with reference to FIG. 8.

The example instructions 600 of FIG. 6 may then end and return a total audience estimate, including an audience from unmeasured locations, to the virtual panel generator 212 and/or to the activity fulfiller 216 of FIG. 2. Control returns to block 414 of FIG. 4.

Figure 7:
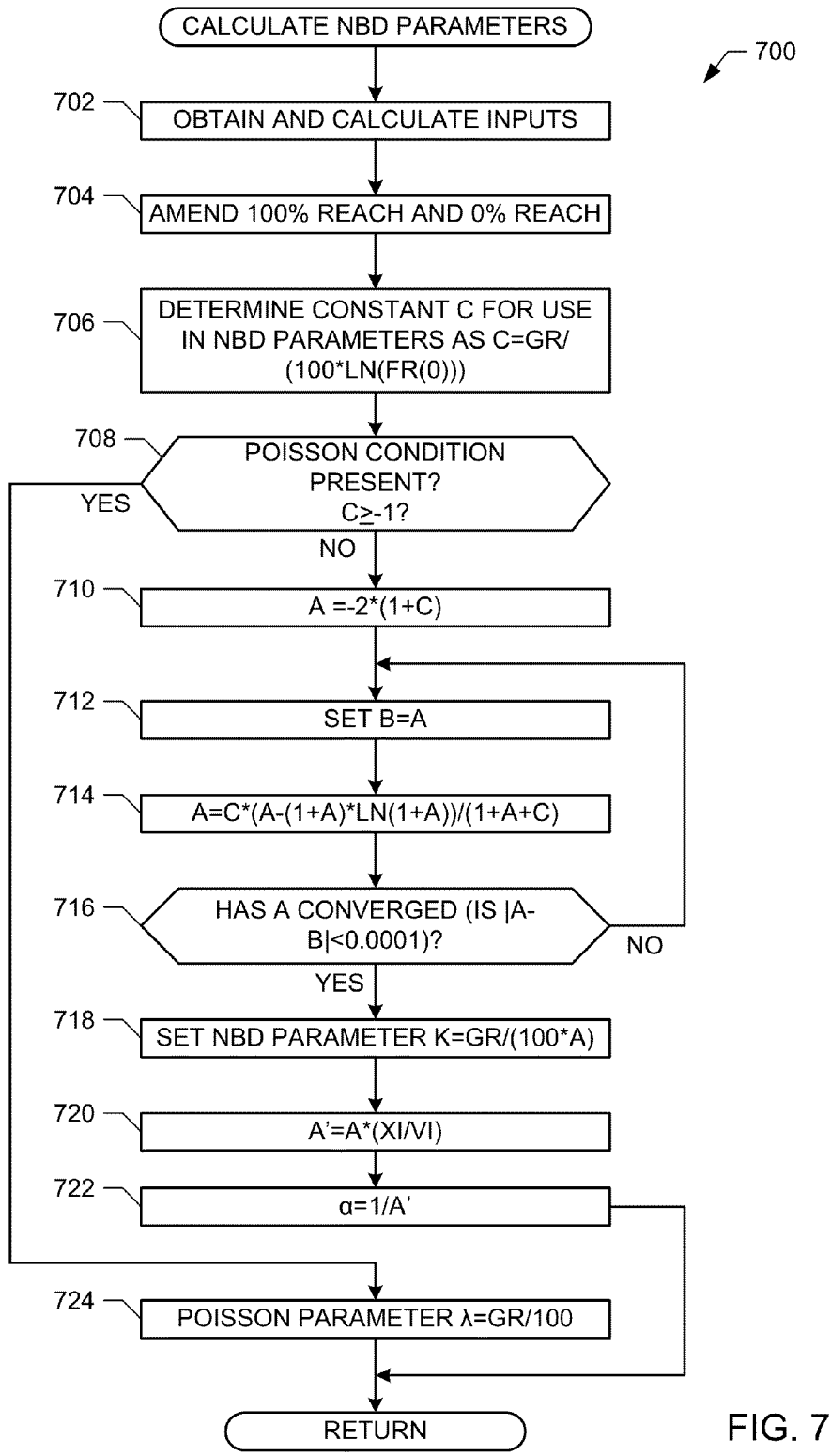
FIG. 7 is a flowchart representative of example computer readable instructions which, when executed, cause a processor to calculate negative binomial distribution parameters.

FIG. 7 is a flowchart representative of example computer readable instructions 700 which, when executed, cause a processor to calculate negative binomial distribution parameters. The example instructions 700 of FIG. 7 may be performed by the example NBD calculator 214 of FIG. 2 to implement block 602 of FIG. 6.

The example NBD calculator 214 obtains inputs for determining the NBD parameters (block 702). Example inputs to the NBD calculator 214 include a weighted panel audience for a demographic group ($U_i$), weighted panel sessions for the demographic group ($V_i$), cleaned server sessions for the demographic group ($X_i$), and the estimated universe for the demographic group ($Y_i$).

The weighted panel audience for the demographic group $U_i$ is the estimated number of persons in the selected demographic group having at least one page view for a URL of interest, scaled to represent the universe for measured locations. An example determination of the weighted audience for the demographic group is described below. The weighted panel sessions for the demographic group $V_i$ is the estimated number of sessions of the panelists, scaled to represent the universe for measured locations. Determination of the cleaned server sessions for the demographic group $X_i$ is described below with reference to FIGS. 13A and 13B. The estimated universe for the demographic group $Y_i$ may be determined from survey data and represents the number of persons in the total population of interest who are in the demographic group.

Based on the inputs, the example NBD calculator 214 can calculate additional information including panel sessions per person in the universe for the demographic group (e.g., Gr=100*Vi/Yi), adjusted panel sessions per person in the universe for the demographic group (e.g., Gp=100*Xi/Yi), and a weighted proportion of persons with zero page views (e.g., fr(0)=1−Ui/Yi).

The example NBD calculator 214 then amends the variables (if necessary) from indicating 100% reach for the demographic group (e.g., all members of the demographic group universe have visited the web site during the reporting period) and/or 0% reach for the demographic group (e.g., no members of the demographic group universe have visited the web site) (block 704). For example, if fr(0)=1, then fr(0) is changed to a number slightly less than 1 (e.g., 0.999). Conversely, if fr(0)=0, then fr(0) is changed to a number slightly greater than 0 (e.g., 0.001).

The example NBD calculator 214 further determine a value for a constant "c" to be used in calculating the NBD parameters (block 706). In the example of FIG. 7, the constant "c" is calculated to be c=Gr/(100*ln(fr(0))). The example NBD calculator 214 determines whether the value of the constant "c" is greater than or equal to −1 to determine whether a Poisson condition is present (block 708). The Poisson condition represents a scenario in which members of a demographic group have less than a threshold likelihood of visiting a web site or genre of web site.

If the Poisson condition is not present (e.g., the constant "c" is less than −1) (block 708), the example NBD calculator 214 estimates the NBD parameter "A." To estimate the parameter "A," the example, NBD calculator 214 sets A=−2*(1+c) (block 710). The example NBD calculator 214 sets a placeholder variable "B" equal to "A" (block 712). The NBD calculator 214 calculates an updated value of A based on the previous value of "A" and based on the constant "C" (e.g., A=C*(A−(1+A)*LN(1+A))/(1+A+C)) (block 714).

The example NBD calculator 214 determines whether the value of "A" has converged (e.g., determines whether the updated value of A is within a threshold amount of B, or the previous value of A) (block 716). If the value of "A" has not converged (block 716), control returns to block 712 to iterate the calculation. When the value of "A" has converged (block 716), the example NBD calculator 214 sets a second NBD parameter "k" (block 718). In the example of FIG. 7, the NBD calculator 214 sets the NBD parameter k=Gr/(100*A).

The example NBD calculator 214 scales the NBD parameter A to be consistent with the cleaned page views and/or video streams by calculating a parameter A'=A*(Xi/Vi) (block 720) and calculating an adjusted NBD parameter α=1/A' (block 722).

If the Poisson condition is present (block 708), the NBD is treated as a Poisson distribution having one parameter ($\lambda$). Thus, the example NBD calculator 214 does not calculate the NBD parameters α and k and, instead, calculates a Poisson parameter $\lambda$=Gr/100 (block 724). When the NBD parameters α and k are calculated (block 722) or when the Poisson parameter is calculated (block 724), the example instructions 700 of FIG. 7 end and control returns to block 604 of FIG. 6.

Figure 8:
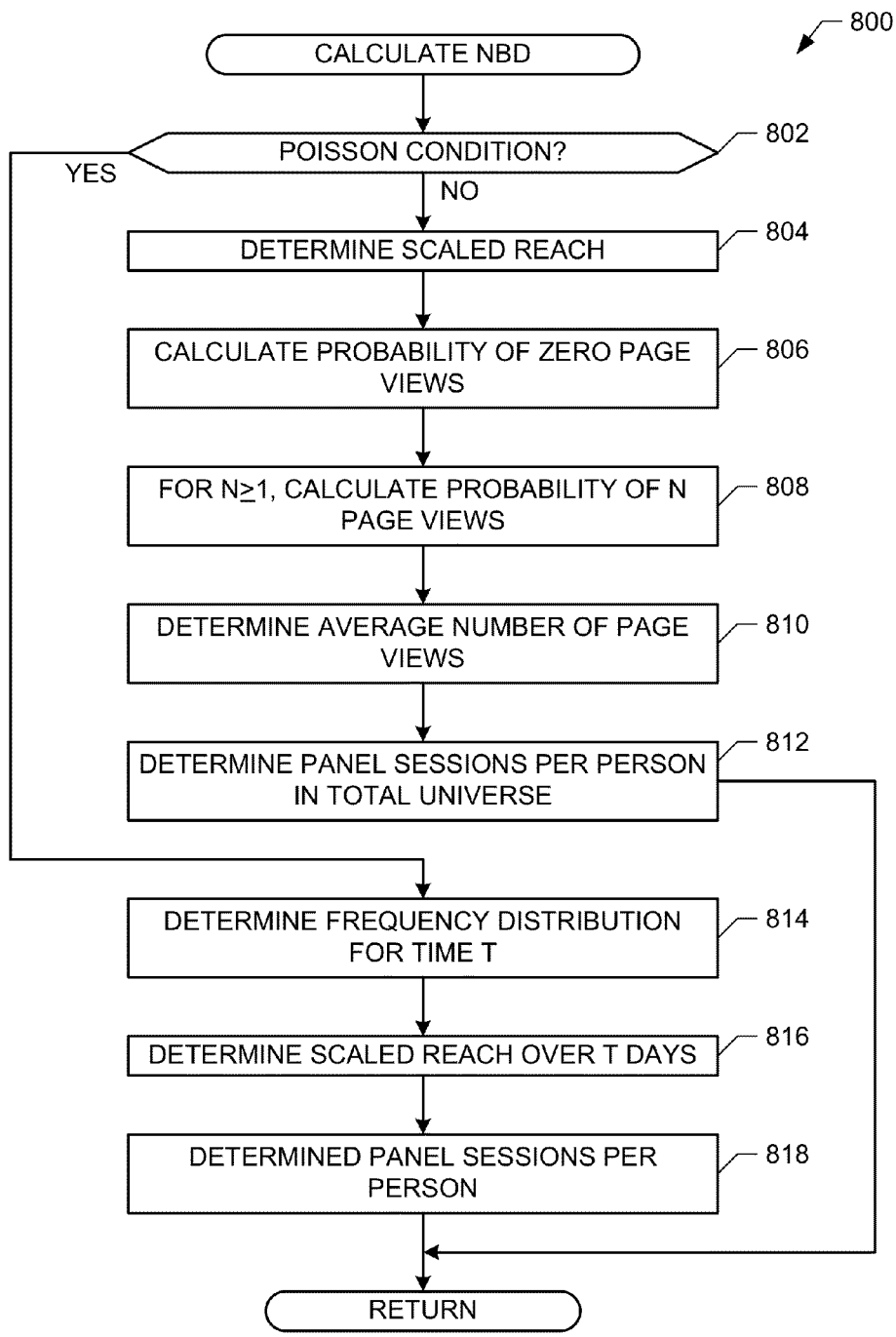
FIG. 8 is a flowchart representative of example computer readable instructions which, when executed, cause a processor to calculate a negative binomial distribution.

FIG. 8 is a flowchart representative of example computer readable instructions 800 which, when executed, cause a processor to calculate a negative binomial distribution. The example instructions 800 of FIG. 8 may be performed by the example NBD calculator 214 of FIG. 2 to implement block 604 of FIG. 6. The example NBD calculations of FIG. 8 are performed for a demographic. Accordingly, the example NBD calculator 214 may iterate the instructions 800 for different demographic groups for a reporting period.

The example NBD calculator 214 of FIG. 2 determines whether the Poisson condition is present (block 802). For example, the NBD calculator 214 may determine which parameter(s) were calculated for the NBD calculation (e.g., $\lambda$ if the Poisson condition is present, α and k if the Poisson condition is not present). If the Poisson condition is not present (block 802), the example NBD calculator 214 calculates the scaled reach for the demographic group (block 804). For example, the NBD calculator 214 of FIG. 2 calculates the scaled reach=$100*(1-(\alpha/(\alpha+t))^k)$, where the time variable "t" is a unit of time such as a reporting period (e.g., t days). The time variable "t" may be set to 1 to scale unique audience members to match the cleaned page views and/or video streams of the illustrated example (e.g., daily page views, daily reporting, etc.).

The example NBD calculator 214 of FIG. 2 calculates the probability of zero exposures (e.g., page views) (block 806). For example, the probability of zero page views, fp(0), may be determined according to fp(0)=$(\alpha/(\alpha+t))^k$, where the time variable "t" is set to 1 to scale unique audience members to match the cleaned page views and/or video streams. The example NBD calculator 214 of FIG. 2 calculates the probability of a number n of page views for n≥1 (block 808). For example, the probability of n page views, fp(n), may be determined according to fp(n)=((k+n−1)/n)*((t/(α+t))*fp(n−1), where the time variable "t" is set to 1 to scale unique audience members to match the cleaned page views and/or video streams. Thus, the probability of a number of page views fp(n) is based on probabilities of lower numbers of page views (fp(n−1), fp(n−x)).

The example NBD calculator 214 of FIG. 2 calculates an average number of page views (or average frequency) AveF (block 810). The average number of page views may be determined by AveF=kt/α, where the time variable "t" is set to 1 to scale unique audience members to match the cleaned page views and/or video streams.

The example NBD calculator 214 calculates a number of panel sessions per person, representing gross rating points for a time "t" (GRP(t)), for the demographic group universe (block 812). The number of panel sessions per person may be determined by GRP(t)=t*Gr, where the time variable "t" is set to 1 to scale unique audience members to match the cleaned page views and/or video streams.

If the Poisson condition is present (block 802), the example NBD calculator 214 determines a frequency distribution for a time t, fp(i), where "i" is a number of page views (block 814). For example, the NBD calculator 214 may determine the frequency distribution fp(i) for a time t (e.g., the distribution of the numbers of page views) according to fp(i)=$(\lambda t)^i * e^{-\lambda t}/i!$ (where ! indicates the factorial operator).

The example NBD calculator 214 of FIG. 2 determines the schedule reach (expressed as a percentage) over t days (block 816). The scaled reach may be determined according to reach=$100*(1-e^{-\lambda t})$. The example NBD calculator 214 of FIG. 2 determines a number of panel sessions per person (Gp(t)) (block 818). The number of panel sessions per person Gp(t) may be determined by Gp(t)=t*Gr.

After performing the NBD for the Poisson condition (blocks 814-818) or for no Poisson condition (blocks 804-812), the example instructions 800 end and control returns to block 414 of FIG. 4. The example instructions 800 may return the calculations determined from the NBD, such as the input variables (e.g., Xi, Vi, Yi, Ui), the scaled reach for the demographic group(s), the probabilities of n≥0 page views for the demographic group(s), the average number(s) of page views for the demographic group(s), the panel sessions per person for the demographic group(s), and/or the frequency distribution(s) for one or more time periods for the demographic group(s).

Figure 9:
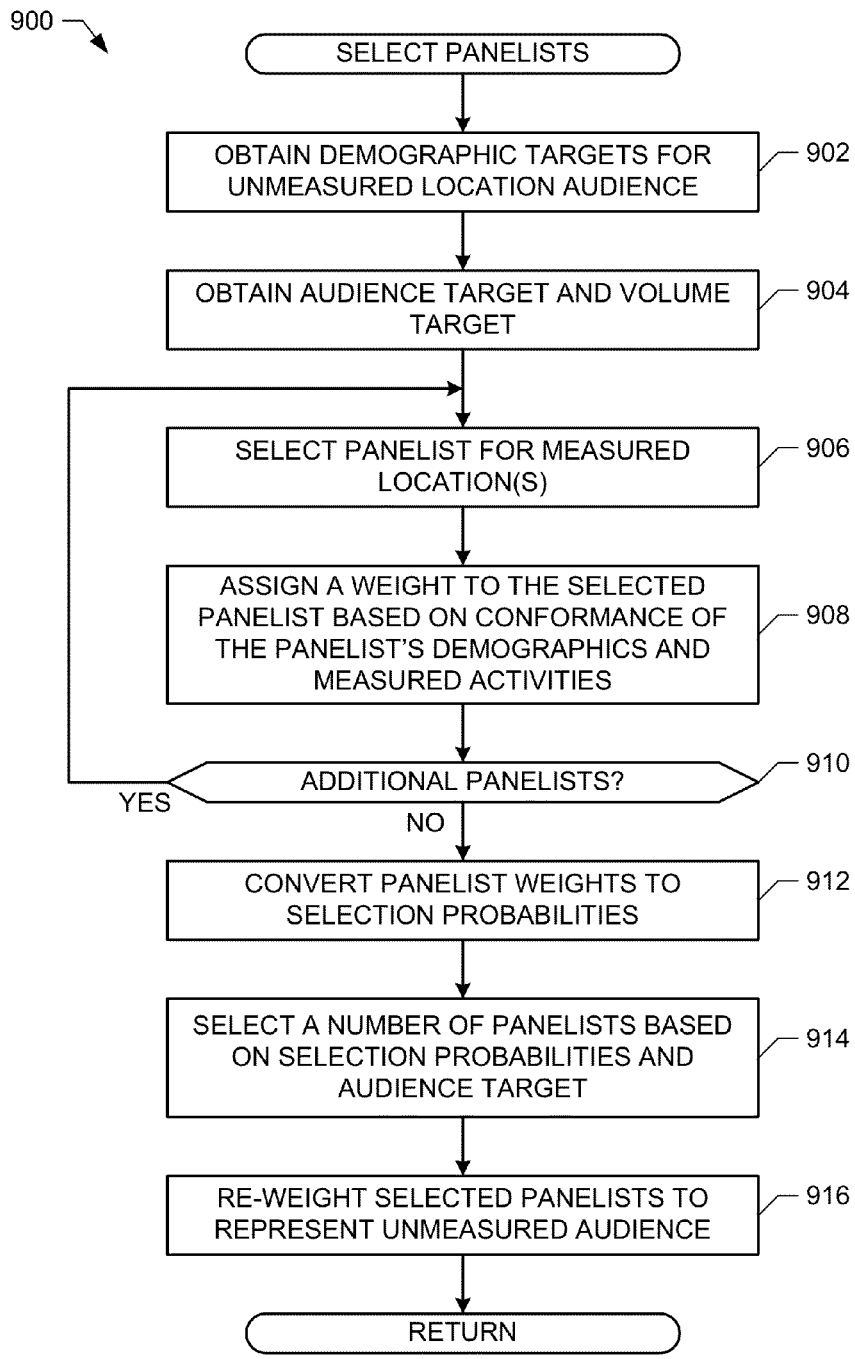
FIG. 9 is a flowchart representative of example computer readable instructions which, when executed, cause a processor to select panelists to represent an unmeasured location audience.

FIG. 9 is a flowchart representative of example computer readable instructions 900 which, when executed, cause a processor to select panelists to represent an unmeasured location audience. The example instructions 900 may be executed by the example virtual panel generator 212 of FIG. 2 to implement block 414 of FIG. 4.

The example virtual panel generator 212 of FIG. 2 obtains demographic targets for an audience corresponding to unmeasured locations (block 902). The demographic targets may be received from the survey-based data collector 204 and provide an estimated demography of the unmeasured locations. The example sample weighter 302 obtains audience targets and volume targets (block 904). The example audience target is the difference between a unique audience reported for the measured locations (e.g., home and work environments) and an estimated unique audience determined by the NBD calculator 214 (e.g., home, work, and unmeasured environments or locations). The example volume target is the difference between a reported volume of page views (e.g., received from the census-based data collector 202) and/or video streams and a smoothed volume of page views and/or video streams, and discounted by the traffic from unmeasured locations. The virtual panel generator 212 of FIG. 2 assumes that volume metrics, such as page views and video streams, follow a Pareto distribution. Example instructions to generate the smoothed volume are described below with reference to FIG. 12. Given audience and volume targets of a specific entity, volume targets for sample selection may be generated by computing selected percentiles of the Pareto distribution. In some examples, the volume metrics are categorized into finite levels prior to calculating the computing the percentiles.

The example sample weighter 302 selects a panelist from the set of panelists for measured location(s) (block 906). The set of panelists may be obtained from the example panel data collector 206. The example sample weighter 302 assigns a weight to the selected panelist based on a conformance of the selected panelist's demographic information and/or measured activities to target demographics and/or target behaviors of the unmeasured location population (block 908). The example sample weighter 302 determines whether there are additional panelists to be weighted (block 910). If there are additional panelists (block 906), control returns to block 906 to select another panelist.

When there are no additional panelists to be weighted (block 910), the example sample selector 304 converts the panelist weights to selection probabilities (block 912). For example, a higher panelist weight results in a higher probability of selection for the corresponding panelist. Based on the selection probabilities, the example sample selector 304 selects a number of the panelists (block 914). In some examples, the sample selector 304 selects the panelists randomly using the selection probabilities to determine the likelihood of randomly selecting any given panelist. The number of panelists selected may be predetermined (e.g., the selected sample size 308 of FIG. 3) based on a number of panelists to represent the unmeasured location audience and/or may be dynamically determined.

The sample re-weighter 306 re-weights the selected panelists (block 916). The re-weighting may be similar or identical to the weighting performed in block 908 and/or may be based on similar or identical factors. The re-weighting causes the selected panelists to more closely represent the demographic, audience, and/or volume targets of the unmeasured location audience. The example instructions 900 may then end and control returns to block 416 of FIG. 4.

Figure 10A:
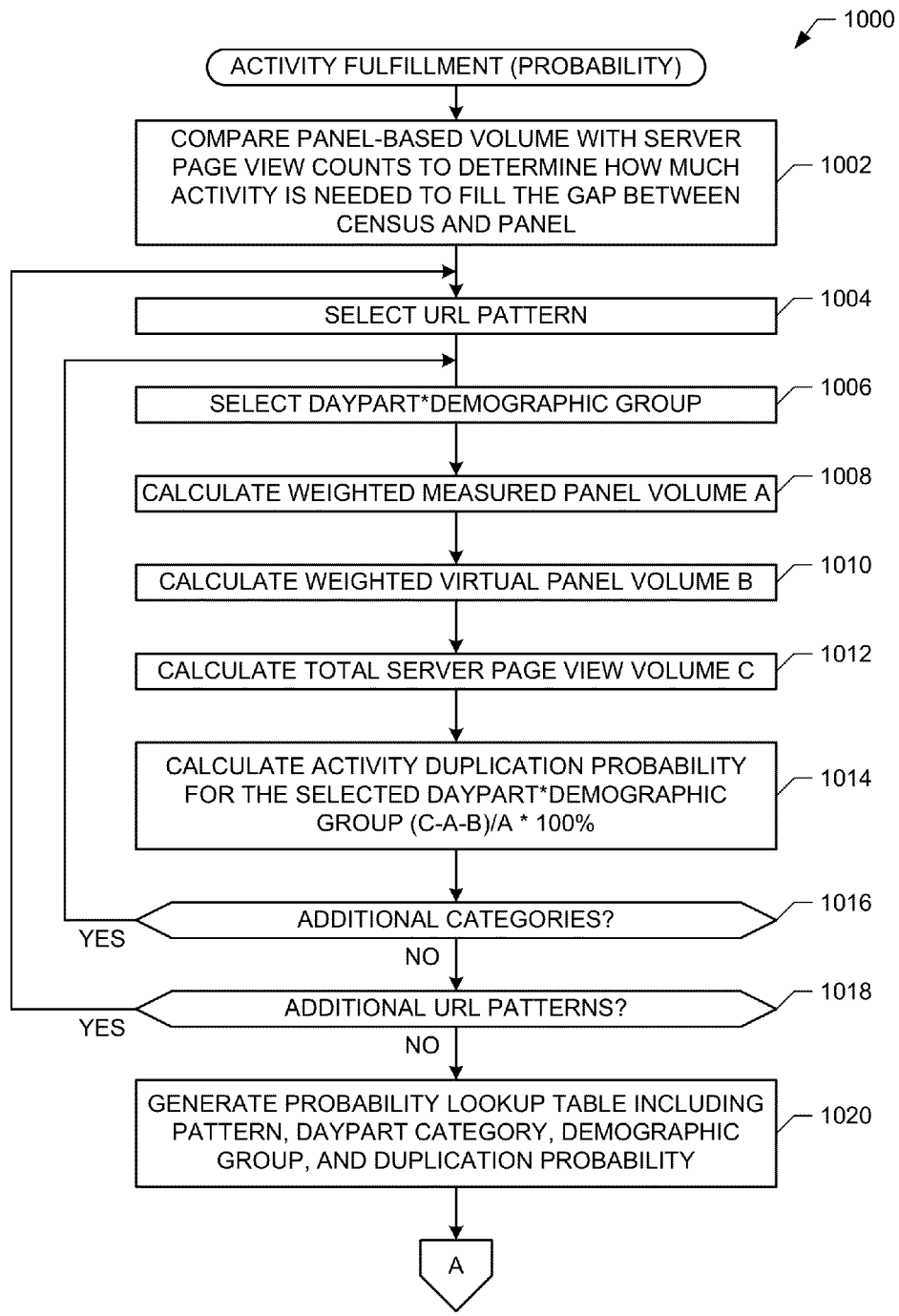
FIGS. 10A and 10B collectively comprise a flowchart representative of example computer readable instructions which, when executed, cause a processor to estimate an audience for unmeasured locations using selected panelists.
Figure 10B:
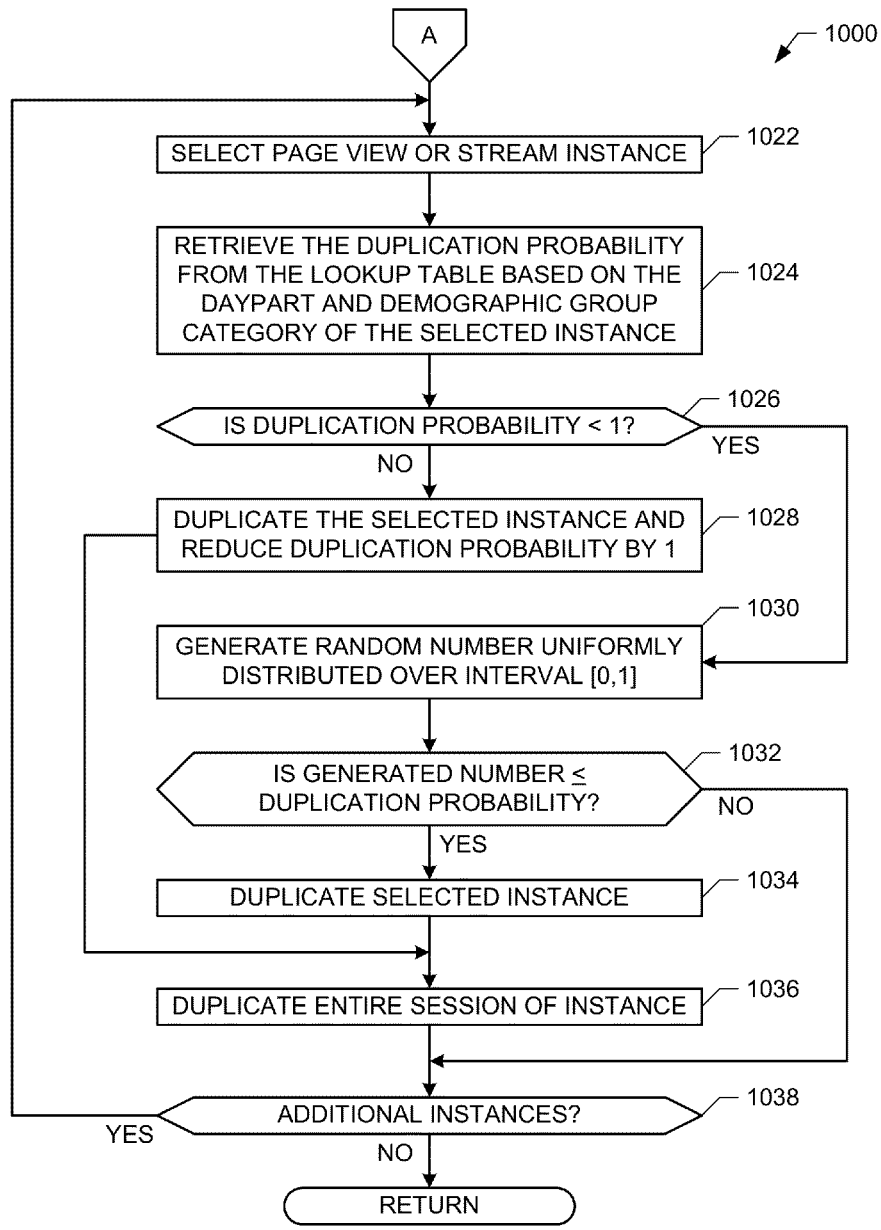

FIGS. 10A and 10B show a flowchart representative of example computer readable instructions 1000 which, when executed, cause a processor to fulfill additional activities using a probability-based method. The example instructions 1000 may be executed to implement the example activity fulfiller 216 of FIG. 2 to perform block 418 of FIG. 4.

The example activity fulfiller 216 of FIG. 2 compares a panel-based volume (e.g., web page views, video streams) with a census-based volume to determine how much activity is needed to fill a gap in volume between the census and panel-based data (block 1002). The example panel-based volume is based on panel activity from measured locations and unmeasured locations (e.g., actual panelist data and virtual panel data). The example activity fulfiller 216 selects a URL pattern from a list of URL patterns (e.g., from a census-based list of URLs and/or URL patterns requested from and/or provided by the servers 106, 108) (block 1004). In some examples, the activity fulfiller 216 and/or the server monitors 134 of FIGS. 1 and/or 2 aggregate instances of URLs into URL patterns.

The example activity fulfiller 216 selects a combination of day part and demographic group (block 1006). The example day part categories are illustrated below in Table 1. The example demographic groups (e.g., gender/age categories) are illustrated below in Table 2. Demographic groups may include additional and/or alternative distinctions. The example activity fulfiller 216 of FIG. 2 selects one of the example day part categories and one of the example demographic groups.

TABLE 1

Day Part Categories

| Day part | Definition |
| --- | --- |
| 1 | midnight-6 am |
| 2 | 6 am-9 am |
| 3 | 9 am-5 pm |
| 4 | 5 pm-8 pm |
| 5 | 8 pm-midnight |

TABLE 2

Demographic Groups

| Gender/Age | Definition |
| --- | --- |
| 1 | Male 2-11 |
| 2 | Female 2-11 |
| 3 | Male 12-17 |
| 4 | Female 12-17 |
| 5 | Male 18-24 |
| 6 | Female 18-24 |
| 7 | Male 25-34 |
| 8 | Female 25-34 |
| 9 | Male 35-44 |
| 10 | Female 35-44 |
| 11 | Male 45-54 |
| 12 | Female 45-54 |
| 13 | Male 55+ |
| 14 | Female 55+ |

The example activity fulfiller 216 of FIG. 2 calculates a weighted measured panel volume (e.g., for measured locations) for the selected group as variable A (block 1008). The example variable A may be determined by estimating the traffic during the day part and by the selected gender and age group from the panelist data. This data is weighted against the virtual panel data to be representative of the audience from measured locations, and can predict a volume of page views from the selected group from measured locations. The activity fulfiller 216 calculates the weighted virtual panel volume (e.g., for unmeasured locations) for the selected group as variable B (block 1010). The example variable B may be determined by estimating the traffic during the day part and by the selected gender group from the virtual panel data. The example virtual panel data is weighted against the panelist data to be representative of the audience from unmeasured location and can predict a volume of page views from the selected group from unmeasured locations. The activity fulfiller 216 calculates the total server page view volume for the selected group as variable C (block 1012). The example variable C may be an estimated portion of a total census-based page view volume during the selected day part that is attributable to the selected demographic group.

The example activity fulfiller 216 of FIG. 2 calculates an activity duplication probability for the selected day part, demographic group, and URL pattern (block 1014). The example activity duplication probability may be determined from the variables A, B, and C (e.g., determined from blocks 1008-1012) as (C−A−B)/A*100%.

The example activity fulfiller 216 determines whether there are additional categories to be processed (block 1016). If there are additional categories, control returns to block 1006 to select another day part and demographic group. When there are no additional categories for the selected URL pattern (block 1016), the example activity fulfiller 216 determine whether there are additional URL patterns to be processed (block 1018). If there are additional URL patterns (block 1018), control returns to block 1004 to select another URL pattern.

When there are no additional URL patterns (block 1018), the example audience classifier generates a probability lookup table specifying a duplication probability for each combination of URL pattern, day part category, and demographic group (block 1020).

Turning to FIG. 10B, the example activity fulfiller 216 of FIG. 2 selects a URL instance (e.g., a page view URL, a video stream URL, etc.) (block 1022). The URL instance may be selected from a table of panel and/or virtual panel activities. The activity fulfiller 216 retrieves the duplication probability from the lookup table for the URL pattern to which the URL instance belongs based on the day part and demographic group of the selected URL instance (block 1024). The activity fulfiller 216 determines whether the duplication probability is less than 1 (e.g., 100%) (block 1026). For example, the duplication probability may be less than 1 if panel activities constitute a large portion of the total server volume for the day part and demographic group.

If the duplication probability is 1 or more (block 1026), the example activity fulfiller 216 duplicates the selected instance and reduces the duplication probability of the URL pattern in the table by 1 (block 1028). Duplicating the selected instances results in the generation of an identical instance. If the duplication probability is less than 1 (block 1026), the example activity fulfiller 216 generates a random number having a uniform distribution between 0 and 1 (block 1030). If the generated number is less than or equal to the duplication probability (block 1032), the example activity fulfiller 216 duplicates the selected instance (block 1034).

If the activity fulfiller 216 duplicates the instance (block 1028 or block 1034), the example audience classifier duplicates the entire session of which the instance is a part (block 1036). Duplication of the session causes all of the instances in the session to be duplicated (without duplicating the selected instance twice). After duplicating the session (block 1036), or if the instance is not duplicated (block 1032), the example audience classifier determines whether there are additional instances in the table of panel and/or virtual panel activities (block 1038). If there are additional instances (block 1038), control returns to block 1022 to select another instance.

When there are no additional instances (block 1038), the example instructions 1000 of FIGS. 10A-10B may end and control returns to block 420 of FIG. 4. The example activity fulfiller 216 may return a listing of additional activity generated via the instructions 1000 and/or an updated list of activity including panel-based activity, virtual panel-based activity, and additional activity generated via the instructions 1000.

Figure 11A:
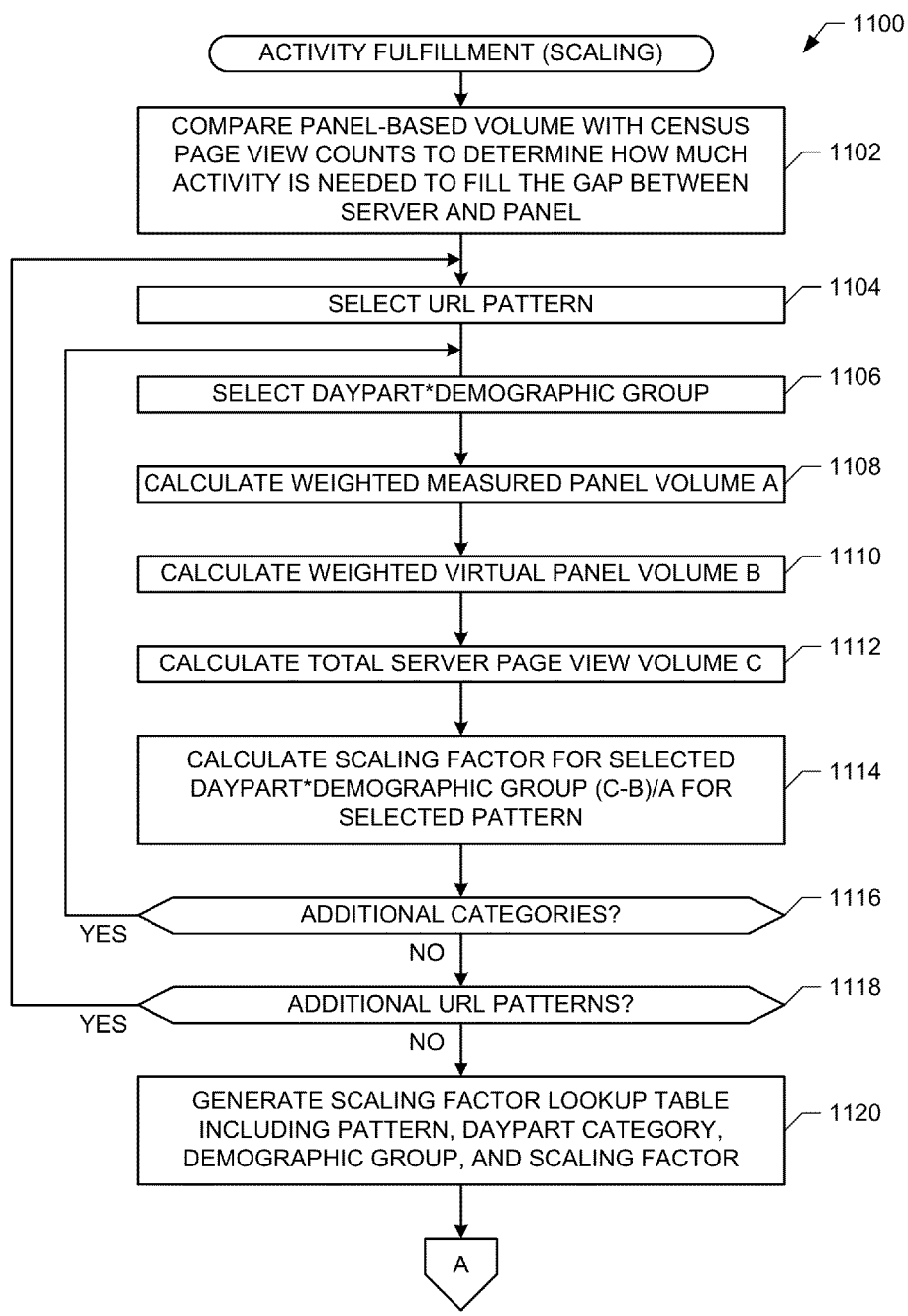
FIGS. 11A and 11B collectively comprise a flowchart representative of example computer readable instructions which, when executed, cause a processor to estimate an audience for unmeasured locations using selected panelists.

FIG. 11 is a flowchart representative of example computer readable instructions 1100 which, when executed, cause a processor to fulfill additional activities using a scaling-based method. The example scaling-based method of FIG. 11 differs from the probability-based method of FIGS. 10A-10B by computing a scaling factor for "missing" activities instead of adding more rows to the table by duplicating panel sessions. The example instructions 1100 may be executed to implement the example activity fulfiller 216 of FIG. 2 to perform block 418 of FIG. 4.

The example activity fulfiller 216 of FIG. 2 compares a panel-based volume (e.g., web page views, video streams) with a census-based volume to determine how much activity is needed to fill a gap in volume between the census and panel-based data (block 1102). The example panel-based volume is based on panel activity from measured locations and unmeasured locations (e.g., actual panelist data and virtual panel data). The example activity fulfiller 216 selects a URL pattern from a list of URL patterns (e.g., from a census-based list of URLs and/or URL patterns requested from and/or provided by the servers 106, 108) (block 1104). In some examples, the activity fulfiller 216 and/or the server monitors 134 of FIGS. 1 and/or 2 aggregate instances of URLs into URL patterns.

The example activity fulfiller 216 selects a combination of day part and demographic group (block 1106). The example day part categories are illustrated above in Table 1. The example demographic groups (e.g., gender/age categories) are illustrated above in FIG. 2. The example activity fulfiller 216 of FIG. 2 selects one of the example day part categories and one of the example demographic groups.

The example activity fulfiller 216 of FIG. 2 calculates a weighted measured panel volume (e.g., for measured locations) for the selected group as variable A (block 1108). The example variable A may be determined by estimating the traffic during the day part and by the selected gender and age group from the panelist data. This data is weighted against the virtual panel data to be representative of the audience from measured locations, and can predict a volume of page views from the selected group from measured locations. The activity fulfiller 216 calculates the weighted virtual panel volume (e.g., for unmeasured locations) for the selected group as variable B (block 1110). The example variable B may be determined by estimating the traffic during the day part and by the selected gender group from the virtual panel data. The example virtual panel data is weighted against the panelist data to be representative of the audience from unmeasured location and can predict a volume of page views from the selected group from unmeasured locations. The activity fulfiller 216 calculates the total census page view volume for the selected group as variable C (block 1112). The example variable C may be an estimated portion of a total census-based page view volume during the selected day part that is attributable to the selected demographic group.

The example activity fulfiller 216 of FIG. 2 calculates a scaling factor for the selected day part, demographic group, and URL pattern (block 1114). The example activity duplication probability may be determined from the variables A, B, and C (e.g., determined from blocks 1108-1112) as (C−A−B)/A*100%.

The example activity fulfiller 216 determines whether there are additional categories to be processed (block 1116). If there are additional categories, control returns to block 1106 to select another day part and demographic group. When there are no additional categories for the selected URL pattern (block 1116), the example activity fulfiller 216 determine whether there are additional URL patterns to be processed (block 1118). If there are additional URL patterns (block 1118), control returns to block 1004 to select another URL pattern.

When there are no additional URL patterns (block 1118), the example audience classifier generates a probability lookup table specifying a duplication probability for each combination of URL pattern, day part category, and demographic group (block 1120).

Figure 11B:
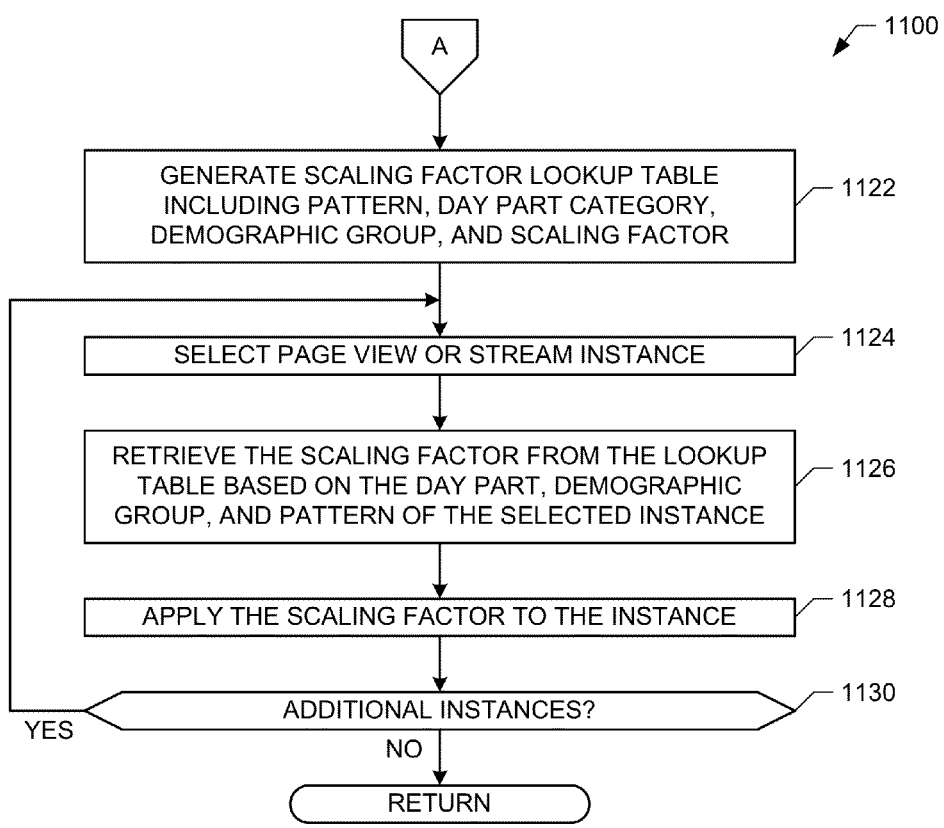

Turning to FIG. 11B, the example activity fulfiller 216 of FIG. 2 generates a scaling factor lookup table including a scaling factor for each combination of URL pattern, day part category, and demographic group (block 1122). The example activity fulfiller 216 of FIG. 2 selects a URL instance (e.g., a page view URL, a video stream URL, etc.) (block 1124). Based on the URL pattern to which the selected instance belongs, the example activity fulfiller 216 retrieves the scaling factor from the lookup table for the day part and the demographic group of the URL instance (block 1126).

The activity fulfiller 216 applies the scaling factor to the instance (block 1128). For example, the activity fulfiller 216 may apply a scaling value to the instance to scale a number of page views or streams corresponding to the instance. The scaled value of the selected instance is not necessarily an integer. The example activity fulfiller 216 determines whether there are additional instances (block 1130). If there are additional instances (block 1130), control returns to block 1124 to select another instance.

When there are no additional instances (block 1130), the instructions 1100 may end and control returns to block 420 of FIG. 4. The example activity fulfiller 216 may return a listing of additional activity generated via the instructions 1100 and/or an updated list of activity including panel-based activity, virtual panel-based activity, and additional activity generated via the instructions 1100.

Figure 12:
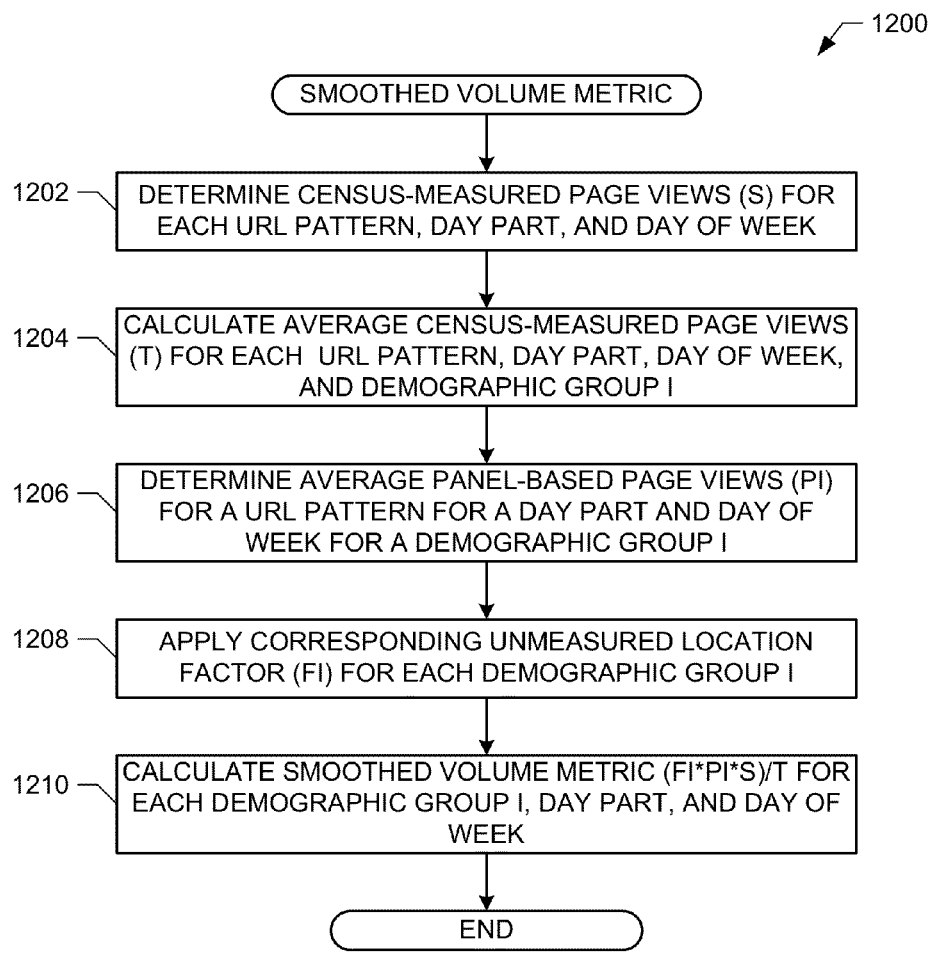
FIG. 12 is a flowchart representative of example computer readable instructions which, when executed, cause a processor to smooth a volume metric.

FIG. 12 is a flowchart representative of example computer readable instructions which, when executed, cause a processor to calculate a smoothed volume metric. The example instructions 1200 of FIG. 12 may be executed as part of determining a volume target (e.g., block 904 of FIG. 9).

The example sample weighter 302 of FIG. 3 determines a number of census-measured page views for each combination of URL pattern, day part, and day of week (block 1202). For example, the server monitor 134 and/or the daemon 136 may provide data showing that a URL pattern had 1.2 million page views on Monday at 1:23:45 PM. The example sample weighter 302 calculates average census-measured page views for each combination of URL pattern, day part, day of week, and demographic group (block 1204). For example, the sample weighter 302 may determine from census data (e.g., via the census-based data collector 202) that average census page views for a URL pattern for the day part including 1:23:45 PM on Mondays during the previous 4 weeks is 800,000 page views.

The sample weighter 302 determines average panel-based page views for each combination of URL pattern, day part, day of week, and demographic group (block 1206). For example, a Men, age 18-24, demographic group may be determined from panel-based data for the day part including 1:23:45 PM on Mondays during the previous 4 weeks as 60,000 page views. The sample weighter 302 determines an unmeasured location factor for the selected demographic group (block 1208). For example, the unmeasured location factor for Men, age 18-24, for an example genre related to a URL pattern is 1.1.

The example sample weighter 302 calculates a smoothed volume metric for each combination of demographic group, day part, and day of week (block 1210). The sample weighter 302 determines the smoothed volume metric according to: smoothed volume metric=$F_i*P_i*S/T$. The example smoothed page views for Men, age 18-24, for the day part of Monday including 1:23:45 PM is (1.1*60,000*1,200,000)/800,000. The example instructions 1200 may then end and control returns to block 906 of FIG. 9.

FIG. 13 is a flowchart representative of example computer readable instructions 1300 which, when executed, cause a processor to calculate inputs for an NBD calculation. The example instructions 1300 may be executed by the example NBD calculator 214 of FIG. 2 to perform block 702 of FIG. 7. To perform the instructions 1300, the NBD calculator 214 receives as inputs weighted panel activity (e.g., from the panel data collector 206 of FIG. 2), census page view and/or video stream measurements (e.g., from the census-based data collector 202 of FIG. 2), and a listing of URL patterns, channels, brands, and/or parents.

The NBD calculator 214 selects a URL pattern (e.g., from a list of URL patterns to be measured) (block 1302). The NBD calculator 214 computes a page view demographic distribution for the selected URL pattern by day of week and/or day part (block 1304). The page view demographic distribution determines a percentage of page views for the selected URL pattern per demographic group during the day of week and/or day part. The page view demographic distribution may be determined using the following equation: panel stream distribution %=(weighted panel−measured page views for demographic group for day part and/or day of week)/(weighted panel−measured page views for all demographic groups for the same day part and/or day of week).

Figure 14:
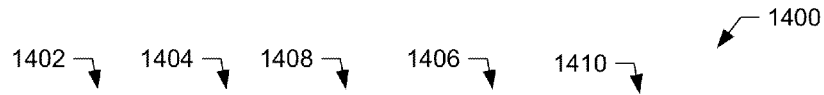
FIG. 14 illustrates an example panel stream distribution percentage among demographic groups for a day part of a day of a week.

FIG. 14 illustrates an example demographic distribution 1400 for an example selected URL pattern, day of week 1402, and day part 1404. The example demographic distribution may be generated for the URL pattern for the remaining combinations of day part and day of week. The example demographic distribution illustrates the page views 1406 for the selected combination of URL pattern, day of week 1402, and day part 1404, for each of a set of demographic groups 1408. The page views 1406 are determined from measurement of a weighted panel (e.g., collected by the panel data collector 206). A demographic distribution, or panel page view distribution 1410, percentage represents the percentage of page views from the corresponding ones of the demographic group 1408 for the corresponding day of week 1402 and day part 1404.

Figure 15:
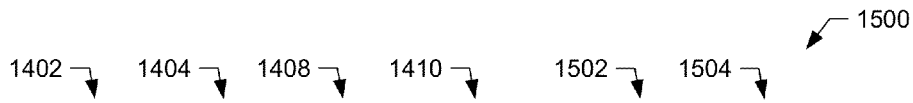
FIG. 15 illustrates a distribution of a number of streams for the demographic groups, the day part, and the day of the week of FIG. 14.

Returning to FIG. 13A, the NBD calculator 214 distributes the adjusted (e.g., cleaned) census page views into demographic groups by multiplying the adjusted census page views by the demographic distribution for each day of week and day part (block 1306). The adjusted census page views are obtained via the census-based data collector 202 of FIG. 2. The demographic distribution is obtained from the panel stream distributions 1410 determined in block 1304. FIG. 15 illustrates a distribution 1500 of a number of streams for the demographic groups, the day part, and the day of the week of FIG. 14. The example distribution 1500 of FIG. 15 includes the day of week 1402, the day part 1404, the demographic groups 1408, and the panel page view distribution 1410 of FIG. 14. The distribution 1500 further includes a number of adjusted census page views 1502 for the day of week 1402 and day part 1404. The example NBD calculator 214 determines calculated numbers of census-measured page views 1504 for each of the demographic groups 1408 for the day of week 1402 and the day part 1404 by multiplying the corresponding adjusted census page views 1502 by the corresponding panel page view distribution 1410.

Returning to FIG. 13A, the example NBD calculator 214 determines whether there are additional URL patterns (block 1308). If there are additional patterns (block 1308), control returns to block 1302 to select another URL pattern. When there are no additional URL patterns for which the adjusted census-measured page views are to be determined (block 1308), the example NBD calculator 214 selects a channel, brand, or parent (block 1310). The selection of a channel, brand, or parent may be based on an entity for which measurement is to be performed. The example NBD calculator 214 selects a demographic group (e.g., one of the demographic groups 1408 of FIGS. 14 and/or 15) (block 1312).

The example NBD calculator 214 aggregates URL patterns into the selected channel, brand, and/or parent for the selected demographic group (block 1314). For example, the NBD calculator 214 may sum the census-measured page views from multiple URL patterns belonging to the selected entity. The NBD calculator 214 aggregates page views from a full reporting period into day parts and/or days of the week for the selected group (block 1316). The reporting period may be a designated or requested reporting period, such as page views for a selected hour, day, week, month, or any other reporting period. FIG. 16 illustrates numbers of census-measured aggregated page views for an example one of the demographic groups 1408 of FIG. 14 for a reporting period. The example number of census-measured aggregated page views may represent the aggregation performed in blocks 1314 and 1316 of FIG. 13A.

Example numbers of aggregated page views 1602 are illustrated for each of the example days of week 1402 and day parts 1404 of FIGS. 14 and/or 15, as well as the days of the week and day parts not illustrated in FIGS. 14 and/or 15. In the example of FIG. 16, a first demographic group (e.g., group 1 of the 14 example groups of FIGS. 14 and/or 15) is credited with 21,305 page views for the selected channel, brand, and/ or parent (e.g., the URL patterns belonging to the selected channel, brand, and/or parent) during a first day part of the third day of the week during a designated reporting period.

Returning to FIG. 13A, the example NBD calculator 214 aggregates weighted panel sessions for the selected group and selected channel, brand, and/or parent (block 1318). The example weighted panel sessions are obtained from the panel data collector 206 of FIG. 2. The sessions may be aggregated to represent sessions occurring during a selected reporting period, including all day parts and days of week, for the selected demographic group.

Figure 13A:
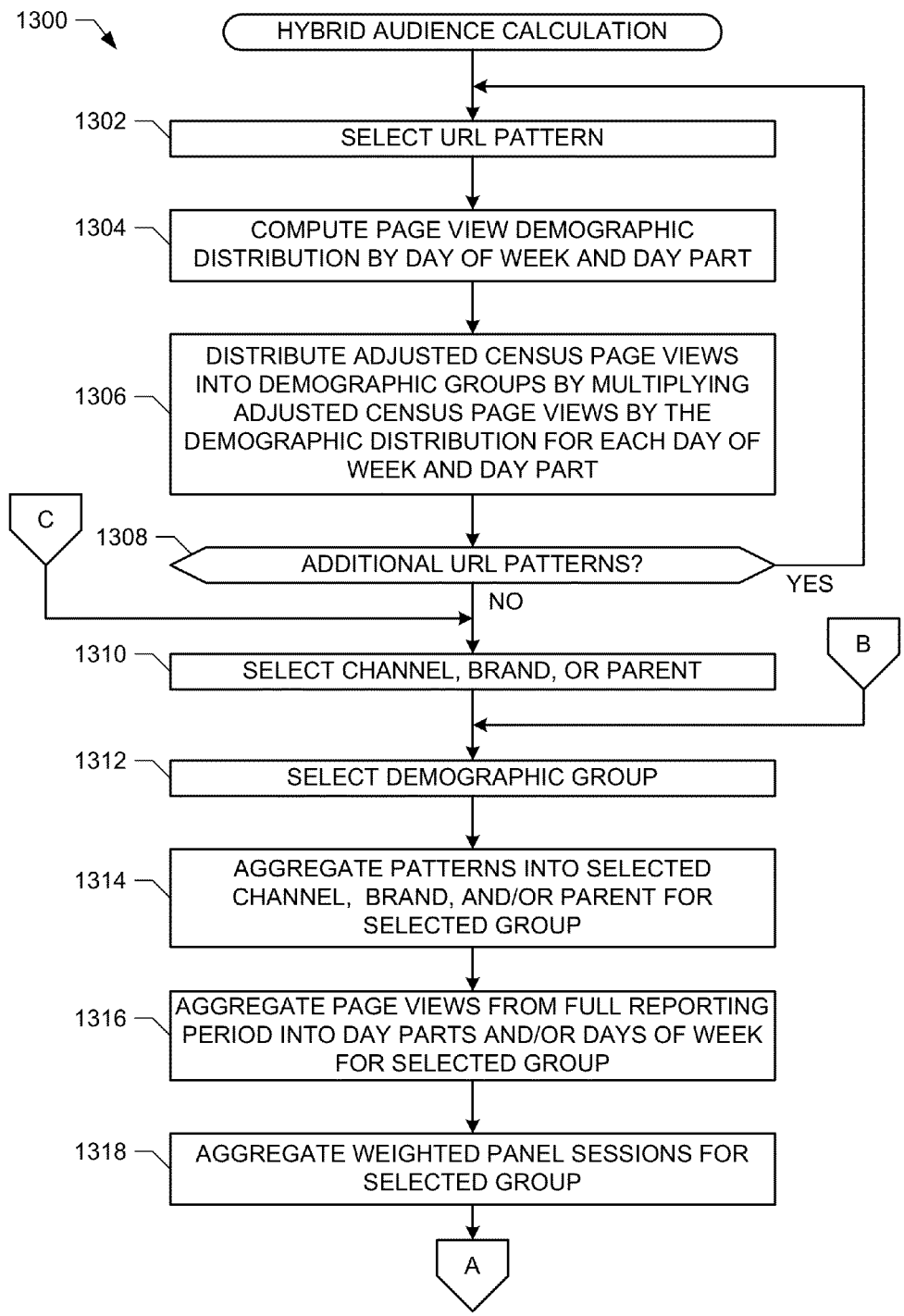
FIGS. 13A and 13B collectively comprise a flowchart representative of example computer readable instructions which, when executed, cause a processor to calculate an online audience.
Figure 13B:
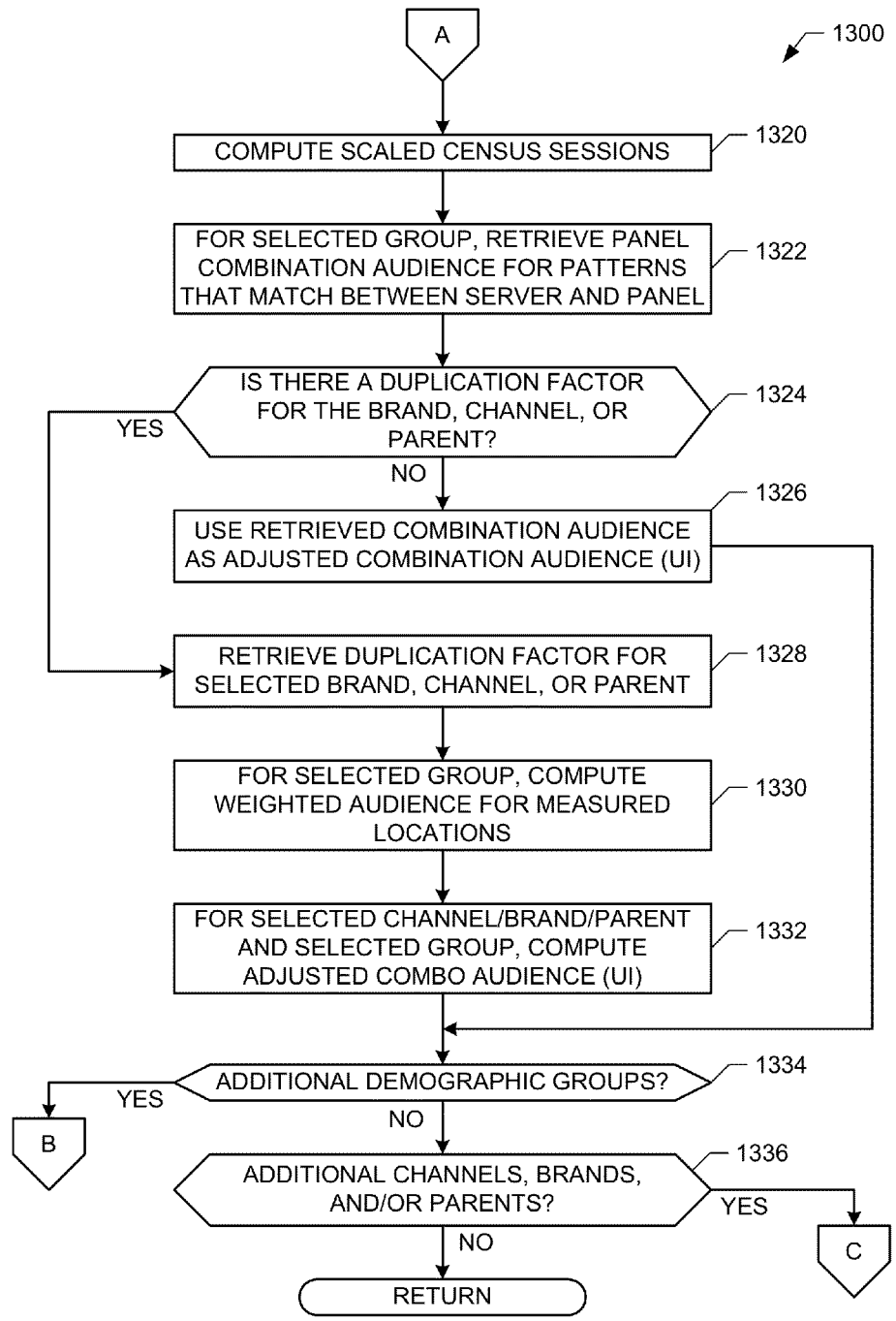

Turning to FIG. 13B, the example NBD calculator 214 computes a number of scaled census sessions (block 1320). For example, the NBD calculator 214 may compute the number of scaled census sessions using the ratio of calculated census page views and weighted panel page views, and the aggregated number of weighted panel sessions. The following equation may be used to compute scaled census sessions for a selected demographic group and channel, brand, and/or parent:

$$\text{scaled server sessions} = \text{aggregated weighted panel sessions} \times \frac{\text{calculated server page views}}{\text{weighted panel page views}}$$

Other methods to determine scaled census sessions may be used. The example equation uses the ratio of panel-based page views to census-based page views to determine a number of census sessions from a panel-based number of sessions. FIG. 17 illustrates example calculated scaled census sessions 1702 for the example demographic groups 1408 of FIGS. 14-16. The example scaled census sessions 1702 are calculated for the example demographic groups based on numbers of weighted panel page views 1704 (e.g., obtained from the panel-based data collector 206), a number of calculated census page views 1706 (e.g., from the calculated page views 1602 of FIG. 16, calculated at block 1316 of FIG. 13A), and a number of weighted panel sessions 1708 (e.g., from the panel-based data collector 206). It should be noted that while the example total number of calculated census page views 1602 of FIG. 16 is different than the calculated census page views 1706 of FIG. 16 for demographic group 1 for illustration, the example calculated census page views 1706 may be obtained as the total number of calculated census page views 1602 determined from block 1316. As illustrated in FIG. 17, the scaled census sessions 1702 for demographic group 2 is calculated as 18,130,627=6,989,826*(72,732,430/28,040, 233) (e.g., truncating the fraction).

Returning to FIG. 13B, the example NBD calculator 214 retrieves a panel combination audience (e.g., an audience for measured locations) for URL patterns that belong to the selected channel, brand, and/or parent and that match between the census-based data and the panel-based data (block 1322). A URL pattern is considered to match in the example of FIGS. 13A-13B if the URL pattern is both measured by the census (e.g., the server monitors 134 and/or the daemon 136) and visited by a member of the panel. The example panel combination audience, which is the total audience for all measured locations (e.g., the home and work environments 120, 122 of FIG. 1) and including overlap in audience, may be retrieved from the example panel-based data collector 206. The panel-based data collector 206 determines the panel combination audience by, for example, weighting panelist data to represent a population represented by the panel, and extrapolating the panel audience to identify an estimate of an audience from the population.

The example NBD calculator 214 determines whether there is a duplication factor for the selected brand, channel, and/or parent (block 1324). The duplication factor represents an overlap (e.g., a percentage, a ratio, etc.) in audience between the different measured locations (e.g., audience members measured at both home and work environments, etc., who are counted as multiple unique audience members). The duplication factor may be obtained from the example panel-based data collector 206. If there is no duplication factor available (block 1324), the example NBD calculator 214 uses the retrieved panel combination audience as a panel combination audience for the demographic group (block 1326).

If there is a duplication factor (block 1324), the example NBD calculator retrieves the duplication factor for the selected brand, channel, and/or parent (block 1328) and computes a weighted audience for the measured locations and the selected group (block 1330). The weighted audience calculated in block 1330 uses the audience for any URLs for the selected channel, brand, and/or parent regardless of whether the URLs match the census-based data. The NBD calculator calculates an adjusted combination audience for the selected channel, brand, and/or parent and the selected group (block 1332). An example equation to calculate the adjusted combination audience is shown below:

$$\text{Adjusted Combination Audience} = (\text{audience for measured locations}) * \\ (1 - \text{duplication}) * \frac{\text{matched combo audience (block 1322)}}{\text{weighted audience (block 1330)}}$$

where the audience for measured locations includes the audience determined via the panel for each measured location (e.g., home environment and work environment). This rate is adjusted by the duplication factor (e.g., multiplied by (1−duplication factor)) to remove overlapping audience members among the measured locations. The adjusted combination audience is the estimated number of persons in the selected demographic group having at least one page view for URLs of the selected channel, brand, and/or parent, and is used in the calculation of NBD parameters as the parameter $U_i$.

The example NBD calculator 214 determines whether there are additional demographic groups (block 1334). If there are additional demographic groups (block 1334), control returns to block 1312 of FIG. 13A. If there are no additional demographic groups for calculation for the selected channel, brand, and/or parent (block 1334), the example NBD calculator 214 determines whether there are additional channels, brands, and/or parents for which an NBD is to be calculated (block 1336). If there are additional channels, brands, and/or parents (block 1336), control returns to block 1310 of FIG. 13A. When there are no additional channels, brands, or parents (block 1336), the example instructions 1300 end and control returns to block 704 of FIG. 7. The example instructions 1300 return the NBD inputs for scaled census sessions ($X_i$) and adjusted combination audience ($U_i$) to the NBD calculation. The instructions 1300 may further return the weighted panel sessions ($V_i$) if the weighted panel sessions are not provided independently.

Figure 18:
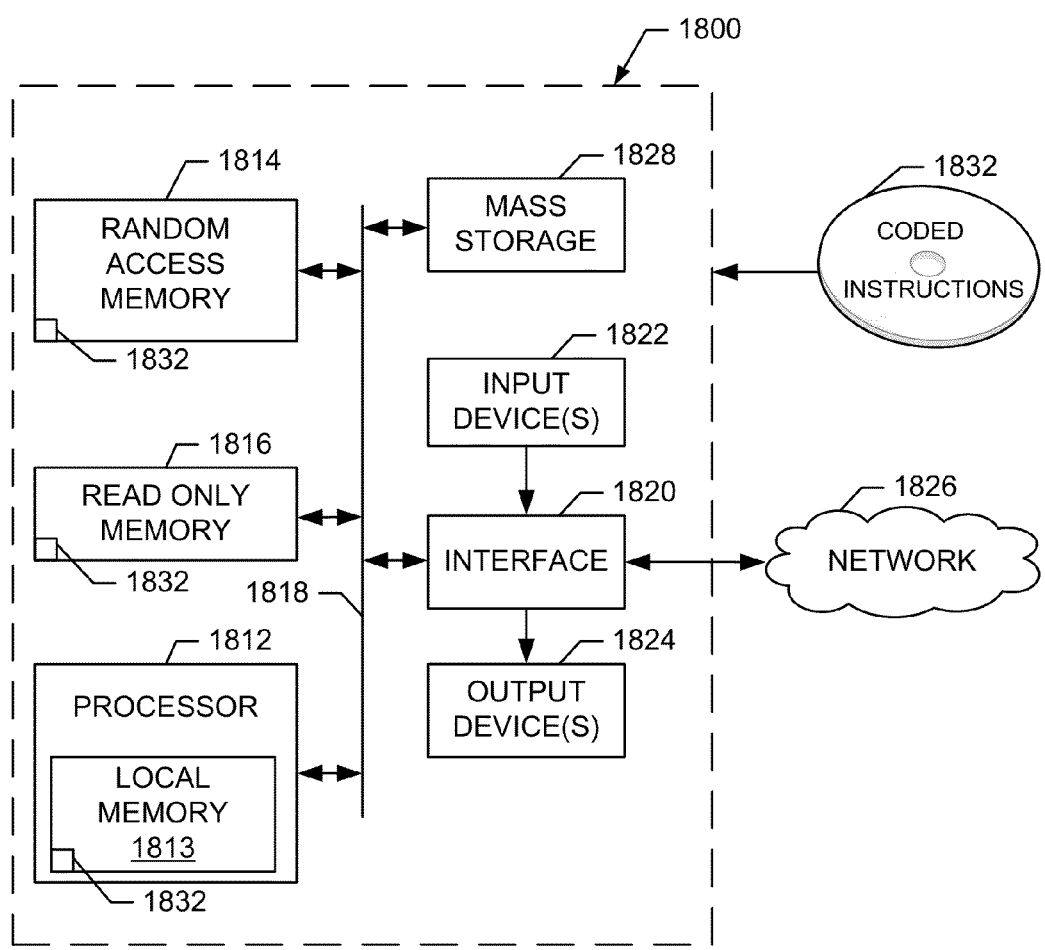
FIG. 18 is a block diagram of an example processor platform capable of executing the instructions of FIGS. 4-13B to implement the systems of FIGS. 1, 2, and/or 3.

FIG. 18 is a block diagram of an example processing platform 1800 capable of executing the instructions of FIGS. 4-13B to implement the hybrid online audience measurement system 102 and/or the virtual panel generator 212 of FIGS. 1-3. The processing platform 1800 can be, for example, a server, a personal computer, and/or any other type of computing device.

The system 1800 of the instant example includes a processor 1812. For example, the processor 1812 can be implemented by one or more microprocessors or controllers from any desired family or manufacturer.

The processor 1812 includes a local memory 1813 (e.g., a cache) and is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processing platform 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, isopoint and/or a voice recognition system.

One or more output devices 1824 are also connected to the interface circuit 1820. The output devices 1824 can be implemented, for example, by display devices (e.g., a liquid crystal display, a cathode ray tube display (CRT), a printer and/or speakers). The interface circuit 1820, thus, typically includes a graphics driver card.

The interface circuit 1820 also includes a communication device such as a modem or network interface card to facilitate exchange of data with external computers via a network 1826 (e.g., an Ethernet connection, a digital subscriber line (DSL), a telephone line, coaxial cable, a cellular telephone system, etc.).

The processing platform 1800 also includes one or more mass storage devices 1828 for storing software and data. Examples of such mass storage devices 1828 include floppy disk drives, hard drive disks, compact disk drives and digital versatile disk (DVD) drives.

The coded instructions 1832 of FIGS. 4-13B may be stored in the mass storage device 1828, in the volatile memory 1814, in the non-volatile memory 1816, and/or on a removable storage medium such as a CD or DVD.

Although certain example systems, methods, apparatus and articles of manufacture have been described herein, the scope of coverage of this patent is not limited thereto. On the contrary, this patent covers all systems, methods, apparatus and articles of manufacture fairly falling within the scope of the claims of this patent.

What is claimed is:

1. A method to classify audience data, comprising:
obtaining panelist data corresponding to a plurality of panelists accessing web pages at measured locations;
classifying the panelist data according to demographic information of the panelists;
generating, via a processor, a virtual panel based on an estimate of web page accesses at unmeasured locations, the generating including:
determining demographics of an individual unmeasured person that accesses a first one of the web pages from a first one of the unmeasured locations, the panelist data not including media monitoring data for the individual unmeasured person,
identifying an individual panelist that accesses the first one of the web pages at a first one of the measured locations, the individual panelist selected to be representative of the individual unmeasured person based on the individual panelist and the individual unmeasured person having a same demographic characteristic, and
adding a copy of a portion of the panelist data corresponding to the individual panelist to the virtual panel to include the individual unmeasured person in the virtual panel, wherein generating the virtual panel is based on a census-based count of page views, the panelist data, and an estimated universe; and classifying page view data associated with the unmeasured locations based on the virtual panel including the individual unmeasured person.

2. The method of claim 1, wherein the virtual panel includes a subset of the plurality of panelists.

3. The method of claim 1, wherein the generating of the virtual panel includes estimating a total audience.

4. The method of claim 1, wherein the generating of the virtual panel includes estimating an audience at the unmeasured locations using a negative binomial distribution.

5. The method of claim 1, wherein the generating of the virtual panel is based on at least one of a demographic target or an activity target.

6. The method of claim 1, wherein the classifying of the panelist data includes estimating a first portion of an online audience based on the panelist data.

7. The method of claim 6, wherein the classifying of the page view data includes estimating a second portion of the online audience, the estimates of the first portion and the second portion identifying numbers of unique audience members.

8. The method of claim 7, further including:

determining a difference between thea census-based count of page views and a number of page views associated with the first and second portions of the page view data; and estimating additional audience activity not represented by the plurality of panelists and the virtual panel based on the difference.

9. The method of claim 1, wherein determining the demographics of the individual unmeasured person includes extracting the demographics from a survey response received from the individual unmeasured person.

10. An apparatus, comprising:

a panel data collector to collect panelist data corresponding to a plurality of panelists accessing web pages at measured locations;

a negative binomial distribution calculator to estimate an audience at unmeasured locations based on the plurality of panelists and a universe estimate;

a virtual panel generator to generate a virtual panel based on an estimate of web page accesses at the unmeasured locations, the virtual panel generator to generate the virtual panel by:

determining demographics of an individual unmeasured person that accesses at least one of the web pages from at least one of the unmeasured locations, the panelist data not including media monitoring data for the individual unmeasured person, identifying an individual panelist that accesses at least one of the web pages at at least one of the measured locations, the individual panelist selected to be representative of the individual unmeasured person based on the individual panelist and the individual unmeasured person having a corresponding demographic profile, and adding a copy of a portion of the panelist data corresponding to the individual panelist to the virtual panel to include the individual unmeasured person in the virtual panel; and an audience classifier to classify the panelist data according to demographic information of the panelists and to classify page view data associated with the unmeasured locations based on data corresponding to individual unmeasured persons in the virtual panel, wherein at least one of the panel data collector, the negative binomial distribution calculator, the virtual panel generator, or the audience classifier includes a logic circuit.

11. The apparatus of claim 10, further including an activity fulfiller to determine online activity based on the plurality of panelists, the audience classifier to classify a third portion of the page view data based on the online activity.

12. The apparatus of claim 10, further including a census-based data collector to receive the page view data representing a number of page views of a web page from measured and unmeasured locations.

13. An apparatus, comprising:

a panel data collector to collect panelist data corresponding to a plurality of panelists accessing web pages at measured locations;

a virtual panel generator to generate a virtual panel based on an estimate of web page accesses at unmeasured locations;

a survey-based data collector to collect a universe estimate, the virtual panel generator to:

determine demographics of an individual unmeasured person that accesses a first one of the web pages from a first one of the unmeasured locations, the panelist data not including media monitoring data for the individual unmeasured person, identify an individual panelist that accesses the first one of the web pages at a first one of the measured locations, the individual panelist selected to be representative of the individual unmeasured person based on the individual panelist and the individual unmeasured person having corresponding demographic characteristics, and add a copy of a portion of the panelist data corresponding to the individual panelist to the virtual panel to include the individual unmeasured person in the virtual panel; and an audience classifier to classify the panelist data according to demographic information of the panelists and to classify page view data associated with the unmeasured locations based on data corresponding to individual unmeasured persons of the virtual panel.

14. A tangible computer readable storage medium comprising machine readable instructions which, when executed, cause a processor to at least:

obtain panelist data corresponding to a plurality of panelists accessing web pages at measured locations;

classify the panelist data according to demographic information of the panelists;

generate a virtual panel based on an estimate of web page accesses at unmeasured locations, a census-based count of page views, the panelist data, and an estimated universe by:

determining demographics of an individual unmeasured person that accesses a first one of the web pages from at least one of the unmeasured locations, the panelist data not including media monitoring data for the individual unmeasured person, identifying an individual panelist that accesses the first one of the web pages at at least one of the measured locations, the individual panelist selected to be representative of the individual unmeasured person based on the individual panelist and the individual unmeasured person having corresponding demographic characteristics, and adding a copy of a portion of the panelist data corresponding to the individual panelist to the virtual panel to include the individual unmeasured person in the virtual panel; and classify page view data associated with the unmeasured locations based on the virtual panel including the individual unmeasured person.

15. The storage medium of claim 14, wherein the virtual panel includes a subset of the plurality of panelists.

16. The storage medium of claim 14, wherein the instructions are to cause the processor to generate the virtual panel by estimating a total audience.

17. The storage medium of claim 14, wherein the instructions are to cause the processor to generate the virtual panel based on at least one of a demographic target or an activity target.

18. The storage medium of claim 14, wherein the instructions are to cause the processor to classify the panelist data by estimating a first portion of an online audience based on the panelist data.

19. The storage medium of claim 18, wherein the instructions are to cause the processor to classify the page view data by estimating a second portion of the online audience, the estimates of the first portion and the second portion identfying numbers of unique audience members.

20. The storage medium of claim 19, wherein the instructions are further to cause the processor to:

determine a difference between the census-based count of page views and a number of page views associated with the first and second portions of the page view data; and estimate additional audience activity not represented by the plurality of panelists and the virtual panel based on the difference.

21. A tangible computer readable storage medium comprising machine readable instructions which, when executed, cause a processor to at least:

obtain panelist data corresponding to a plurality of panelists accessing web pages at measured locations;

classify the panelist data according to demographic information of the panelists;

determine demographics of an individual unmeasured person that accesses a first one of the web pages from a first one of unmeasured locations, the panelist data not including media monitoring data for the individual unmeasured person;

identify an individual panelist that accesses the first one of the web pages at a first one of the measured locations, the individual panelist selected to be representative of the individual unmeasured person based on the individual panelist and the individual unmeasured person having a corresponding demographic characteristic;

add a copy of a portion of the panelist data corresponding to the individual panelist to a virtual panel to include the individual unmeasured person in the virtual panel; and classify page view data associated with the unmeasured locations based on data corresponding to individual unmeasured persons of the virtual panel.

* * * * *

UNITED STATES PATENT AND TRADEMARK OFFICE
CERTIFICATE OF CORRECTION

| | | |
|---|---|---|
| PATENT NO. | : 9,224,094 B2 | Page 1 of 1 |
| APPLICATION NO. | : 13/750775 | |
| DATED | : December 29, 2015 | |
| INVENTOR(S) | : Oliver et al. | |

It is certified that error appears in the above-identified patent and that said Letters Patent is hereby corrected as shown below:

Claims

Column 31, line 25, claim 8: after "determining a difference between", replace "thea" with --the--.

Signed and Sealed this
Twenty-ninth Day of March, 2016

Michelle K. Lee
*Director of the United States Patent and Trademark Office*